(12) United States Patent
Fukiura et al.

(10) Patent No.: US 10,295,207 B2
(45) Date of Patent: May 21, 2019

(54) AIR BLOWING DEVICE

(71) Applicant: KOKEN LTD., Tokyo (JP)

(72) Inventors: Kazuma Fukiura, Tokyo (JP); Tomoyuki Kakinuma, Tokyo (JP); Taketo Suzuki, Tokyo (JP); Takahiro Sato, Tokyo (JP)

(73) Assignee: Koken Ltd., Tokyo (JP)

( * ) Notice: Subject to any disclaimer, the term of this patent is extended or adjusted under 35 U.S.C. 154(b) by 29 days.

(21) Appl. No.: 15/472,723

(22) Filed: Mar. 29, 2017

(65) Prior Publication Data

US 2017/0198929 A1  Jul. 13, 2017

Related U.S. Application Data

(62) Division of application No. 13/805,458, filed as application No. PCT/JP2011/064896 on Jun. 29, 2011, now Pat. No. 9,644,855.

(30) Foreign Application Priority Data

Jun. 30, 2010 (JP) ................................ 2010-150505

(51) Int. Cl.
*F24F 7/007* (2006.01)
*F24F 1/0071* (2019.01)
(Continued)

(52) U.S. Cl.
CPC ................ *F24F 7/007* (2013.01); *B08B 5/02* (2013.01); *B08B 15/00* (2013.01); *F24F 1/0071* (2019.02);
(Continued)

(58) Field of Classification Search
CPC .......... F24F 7/08; F24F 13/068; F24F 3/1607; F24F 1/0096; F24F 13/08;
(Continued)

(56) References Cited

U.S. PATENT DOCUMENTS 5,264,015 A * 11/1993 Matsui ................. F24F 3/1603
55/467
6,193,603 B1   2/2001 Tai
(Continued)

FOREIGN PATENT DOCUMENTS

JP   60-50329       3/1985
JP   66050329 U *  4/1985
(Continued)

OTHER PUBLICATIONS

Yuji Kubota et al., "Open Clean Zone no Keisei", Clean Technology, May 10, 2010, vol. 20, No. 5, pp. 66-69.

Primary Examiner — Gregory L Huson
Assistant Examiner — Brandon Nelan
(74) Attorney, Agent, or Firm — Clark & Brody

(57) ABSTRACT

An air blowing device adapted to be used in such a manner that at least two of the devices are horizontally and/or vertically aligned with each other, thereby to obtain a uniform flow of air in the downstream direction from device to device. An air-permeable front surface (11*f*) is formed to the blowing device (1) at the downstream side of a rectifier mechanism, and side surface sections (11*a*) which extend in the upstream direction of the device (1) are formed at both edges of the air-permeable front surface (11*f*). First ventilation holes (70*a*) are distributed at the air-permeable front surface (11*f*), and second ventilation holes (70*b*) are distributed at the side surface sections (11*a*).

5 Claims, 14 Drawing Sheets

(51) Int. Cl.
*F24F 3/16* (2006.01)
*F24F 13/08* (2006.01)
*F24F 7/08* (2006.01)
*F24F 13/068* (2006.01)
*B08B 5/02* (2006.01)
*B08B 15/00* (2006.01)
*F24F 13/28* (2006.01)

(52) U.S. Cl.
CPC .............. *F24F 3/1607* (2013.01); *F24F 7/08* (2013.01); *F24F 13/068* (2013.01); *F24F 13/08* (2013.01); *F24F 13/28* (2013.01); *F24F 2003/1614* (2013.01); *F24F 2221/125* (2013.01); *F24F 2221/36* (2013.01); *Y02A 50/21* (2018.01)

(58) Field of Classification Search
CPC ......... F24F 2221/125; F24F 2003/1614; F24F 7/007; F24F 13/28; F24F 2221/36; B08B 15/00; B08B 5/02
See application file for complete search history.

(56) References Cited

U.S. PATENT DOCUMENTS

| | | | |
|---|---|---|---|
| 7,297,050 | B2 | 11/2007 | Bridenne |
| 2008/0209870 | A1 | 9/2008 | Solberg |
| 2009/0156112 | A1 | 6/2009 | Kubota |
| 2010/0135863 | A1 | 6/2010 | Panculescu |

FOREIGN PATENT DOCUMENTS

| | | | |
|---|---|---|---|
| JP | 61-74041 | | 5/1986 |
| JP | 63-176943 | | 7/1988 |
| JP | 2001-116335 | | 4/2001 |
| JP | 2003-004287 | | 1/2003 |
| JP | 2008-075945 | | 4/2008 |
| JP | 2008-275266 | | 11/2008 |
| JP | 2010-096497 | | 4/2010 |
| JP | 201096497 | A * | 4/2010 |
| JP | 2010-520436 | | 6/2010 |
| WO | 2007/108160 | | 9/2007 |

* cited by examiner

AIR BLOWING DEVICE

This application is a Divisional of U.S. Ser. No. 13/805,458 filed on Dec. 19, 2012, which is a national phase of PCT/JP2011/064896 filed on Jun. 29, 2011, which is published as WO2012/002424 on May 1, 2012.

TECHNICAL FIELD

The present invention relates to air blowing devices capable of supplying a uniform flow of air, and more particularly, relates to such air blowing devices adapted to be used in such a manner that at least two of such devices are horizontally or vertically aligned with each other.

BACKGROUND ART

Conventionally, clean benches are known to improve air cleanliness of local working spaces, and push-pull ventilators are known to collect toxic substances occurring in local working spaces without diffusing the toxic substances throughout the working space and over the surrounding space. Air blowing devices are also known to be used in these clean benches and ventilators.

For example, JP 2003-4287 A (PTL 1) discloses a uniform flow blowing device that includes an air blowing surface on the front surface side of a hollow box structure. On the rear side of the air blowing surface, a plurality of distribution plates are disposed. When air flows into the device, the air passes between the distribution plates and then is blown out in a uniform flow through the air blowing surface.

JP 2008-75945 A (PTL 2) discloses a local air cleaner that is used to locally clean the interior of a clean room. The local air cleaner includes a blowing device equipped with an air blowing unit, an inlet device equipped with an air inlet unit. These two devices are disposed to be opposed to each other so that a local part of the interior of the clean room to be cleaned is located therebetween.

JP 2008-275266 A (PTL 3) discloses a local air cleaner that includes a pair of push hoods capable of blowing out a uniform flow of clean air. The pair of push hoods have mutually opposing air-flow opening surfaces through which to blow out the clean air. That is, the pair of push hoods are used in the state where the flows of air from the respective air-flow opening surfaces collide with one another.

CITATION LIST

Patent Literature

{PTL 1} JP 2003-4287 A
{PTL 2} JP 2008-75945 A
{PTL 3} JP 2008-275266 A

SUMMARY OF INVENTION

Technical Problem

Conventional blowing devices create, in a large room, a local working space for a uniform flow of air or a uniform flow of clean air. Considering easy handling or movability of the devices, they are provided to consumers oftentimes in comparatively reduced sizes. Additionally, depending on the kind of work and/or procedure of work, enough working space may not be created by one blowing device or a pair of blowing devices. However, the conventional blowing devices are, even when two or more of them are horizontally aligned with each other, i.e., arranged to be side by side, likely to create spaces lacking supply of a uniform flow of air or clean air especially between the adjacent devices and at the downstream side in the vicinity thereof. These spaces are inappropriate for serving the purpose of working space even if these are only small part of the working space.

An object of the present invention is to provide an improvement over the conventional blowing devices in that, when the blowing devices are horizontally and/or vertically aligned with each other, a uniform flow of air or a uniform flow of clean air is supplied to between the respective devices and toward the downstream side.

Solution to Problem

The present invention includes a first aspect and a second aspect. The first aspect is directed to an air blowing device including a rectifier mechanism disposed at a flow path through which air flows from an upstream side toward a downstream side of the flow path, whereby the air past the rectifier mechanism is rendered a uniform air flow to be supplied to a downstream side of the rectifier mechanism.

In this air blowing device, the first aspect includes the following features:

the device includes a front-rear direction corresponding to a flow direction of the uniform air flow with a forward side of the front-rear direction corresponding to the downstream side, a width direction orthogonal to the front-rear direction, and a vertical direction orthogonal to the front-rear direction and the width direction;

the device further includes an air-permeable front surface formed at the downstream side of the rectifier mechanism and including a plurality of first ventilation holes distributed in the width direction and the vertical direction, and side surface portions extending toward the upstream side from lateral edges of the air-permeable front surface that are disposed at respective side portions of the air-permeable front surface in the width direction and extend in the vertical direction; and a plurality of second ventilation holes are distributed at at least one of the side surface portions opposite to each other in the width direction, wherein the second ventilation holes are configured to blow out part of the air past the rectifier mechanism outward in the width direction.

In one embodiment of the first aspect, the air-permeable front surface extends in the width direction beyond at least one of side portions of the rectifier mechanism.

In another embodiment of the first aspect, each segment of the side surface portions at which the second ventilation holes are distributed is formed of a plate material constituting the air-permeable front surface and being bent at the lateral edges toward the upstream side.

In even another embodiment of the first aspect, the first and second ventilation holes each include a hole diameter in a range of 0.5 to 4 mm, and a ratio of an area of the first ventilation holes to 10 $cm^2$ area of the air-permeable front surface and a ratio of an area of the second ventilation holes to 10 $cm^2$ area of the side surface portion each are 20 to 50%.

In yet another embodiment of the first aspect, a distance between respective centers of adjacent first ventilation holes and a distance between respective centers of adjacent second ventilation holes are in a range of 1 to 6 mm.

In still another embodiment of the first aspect, the air-permeable front surface includes at least one of an upper vertical edge and a lower vertical edge disposed in the vertical direction and extending in the width direction. The at least one of the vertical edges includes an end surface portion crossing the air-permeable front surface and extending toward the upstream side. The end surface portion includes a plurality of third ventilation holes distributed at the end surface portion. The third ventilation holes are configured to blow out part of the air past the rectifier mechanism outward in the vertical direction.

In a further embodiment of the first aspect, the air-permeable front surface includes at least one of an upper vertical edge and a lower vertical edge disposed in the vertical direction and extending in the width direction. The at least one of the vertical edges includes an end surface portion crossing the air-permeable front surface and extending toward the upstream side. A spacer is interposed between the rectifier mechanism and the air-permeable front surface. The spacer includes side wall portions extending in the vertical direction, and a top surface portion and a bottom surface portion coupled to respective end portions of the side wall portions in the vertical direction and extending in the width direction. A size in the width direction defined between the side wall portions gradually increases toward the downstream side to exceed a size of the rectifier mechanism in the width direction. The side wall portions constitute at least a part of the respective side surface portions, and the top surface portion and the bottom surface portion constitute at least a part of the end surface portion of the device. The air-permeable front surface is coupled to the side wall portions of the spacer and to the top surface portion and the bottom surface portion of the spacer at the corner edges and the upper and lower vertical edges. At least one side wall portion among the side wall portions includes the plurality of second ventilation holes.

In an even further embodiment of the first aspect, the spacer is removable relative to the device.

In a yet further embodiment of the first aspect, the spacer and the air-permeable front surface are mutually removable.

In a still further embodiment of the first aspect, the air-permeable front surface includes at least one of an upper vertical edge and a lower vertical edge disposed in the vertical direction and extending in the width direction. The at least one of the vertical edges includes an end surface portion crossing the air-permeable front surface and extending toward the upstream side. A spacer is interposed between the rectifier mechanism and the air-permeable front surface. The spacer includes side wall portions extending in the vertical direction, and a top surface portion and a bottom surface portion coupled to respective end portions of the side wall portions in the vertical direction and extending in the width direction. At least one of the top surface portion and the bottom surface portion includes the plurality of third ventilation holes.

In further another embodiment of the first aspect, the device includes a plurality of devices aligned in the width direction. The second ventilation holes are configured to blow out part of the air past the rectifier mechanism toward the side surface portions of an adjacent device.

In even further another embodiment of the first aspect, the device includes a plurality of devices wherein in each of the plurality of devices, the air-permeable front surface includes at least one of an upper vertical edge and a lower vertical edge disposed in the vertical direction and extending in the width direction. The at least one of the vertical edges includes an end surface portion crossing the air-permeable front surface and extending toward the upstream side. The end surface portion includes a plurality of third ventilation holes distributed at the end surface portion. The second ventilation holes and the third ventilation holes are configured to blow out part of the air past the rectifier mechanism toward the side surface portions of an adjacent device in the width direction and toward the end surface portion of an adjacent device in the vertical direction.

The second aspect of the present invention is directed to an air blowing device including a rectifier mechanism disposed at a flow path through which air flows from an upstream side toward a downstream side of the flow path, whereby the air past the rectifier mechanism is rendered a uniform air flow to be supplied to a downstream side of the rectifier mechanism.

In this blowing device, the second aspect includes the flowing features:

the device includes a front-rear direction corresponding to a flow direction of the uniform air flow with a forward side of the front-rear direction corresponding to the downstream side, a width direction orthogonal to the front-rear direction, and a vertical direction orthogonal to the front-rear direction and the width direction;

the device further includes an air-permeable front surface formed at the downstream side of the rectifier mechanism and including a plurality of first ventilation holes distributed in the width direction and the vertical direction, and an end surface portion extending toward the upstream side and crossing the air-permeable front surface from at least one of an upper vertical edge and a lower vertical edge each disposed in the vertical direction of the air-permeable front surface and extending in the width direction;

the end surface portion includes a plurality of third ventilation holes distributed at the end surface portion and coupled to the flow path. The third ventilation holes are configured to blow out part of the air past the rectifier mechanism outward in the vertical direction.

In one embodiment of the second aspect, the first and third ventilation holes each include a hole diameter in a range of 0.5 to 4 mm, and a ratio of an area of the first ventilation holes to 10 cm$^2$ area of the air-permeable front surface and a ratio of an area of the third ventilation holes to 10 cm$^2$ area of the end surface portion is in a range of 20 to 50%.

In another embodiment of the second aspect, a distance between respective centers of adjacent first ventilation holes and a distance between respective centers of adjacent third ventilation holes are in a range of 1 to 6 mm.

In even another embodiment of the second aspect, the device includes side surface portions extending toward the upstream side from lateral edges of the air-permeable front surface that are disposed at respective side portions of the air-permeable front surface in the width direction and extend in the vertical direction. A plurality of second ventilation holes are distributed at at least one of opposite side surface portions in the width direction. The second ventilation holes are configured to blow out part of the air past the rectifier mechanism outward in the width direction.

In yet another embodiment of the second aspect, the device is one of a plurality of devices aligned in the vertical direction. The third ventilation holes are configured to blow out part of the air past the rectifier mechanism toward the end surface portion of an adjacent device.

In at least one embodiment of the first and second aspects, the air-permeable front surface is mountable and removable relative to the device.

Advantageous Effects of the Invention

In the air blowing device according to the first aspect among the present invention, an air-permeable front surface is disposed at the downstream side of the rectifier mechanism, which is disposed at the flow path through which air flows from an upstream side toward a downstream side of the flow path. The air-permeable front surface is spaced apart from the rectifier mechanism by a desired distance and includes a plurality of first ventilation holes distributed at the air-permeable front surface. To lateral edges of the air-permeable front surface, side surface portions of the device are coupled. At the side surface portions, a plurality of second ventilation holes are distributed. The air past the rectifier mechanism passes through the first ventilation holes of the air-permeable front surface and turns into a uniform air flow to be supplied to the forward side of the blowing device. Additionally, part of the air collides with the air-permeable front surface and expands in the width direction to be blown out through the second ventilation holes outward in the width direction. The use of two blowing devices aligned horizontally with a gap therebetween causes collision of air blown out from the second ventilation holes of the respective two devices. This prevents air existing at the rear side of the two devices from flowing between the two devices to the forward side of the two devices. In these two blowing devices, the entire width direction area of the horizontally aligned blowing devices can be rendered a working space filled with a uniform flow of air or a working space filled with a uniform flow of clean air.

In the air blowing device according to the second aspect of the present invention, the entire vertical direction area of vertically aligned blowing devices can be rendered a working space filled with a uniform flow of air or a working space filled with a uniform flow of clean air.

DESCRIPTION OF EMBODIMENTS

Referring to the accompanying drawings, an air blowing device according to the present invention will be described in detail below.

Figure 1:
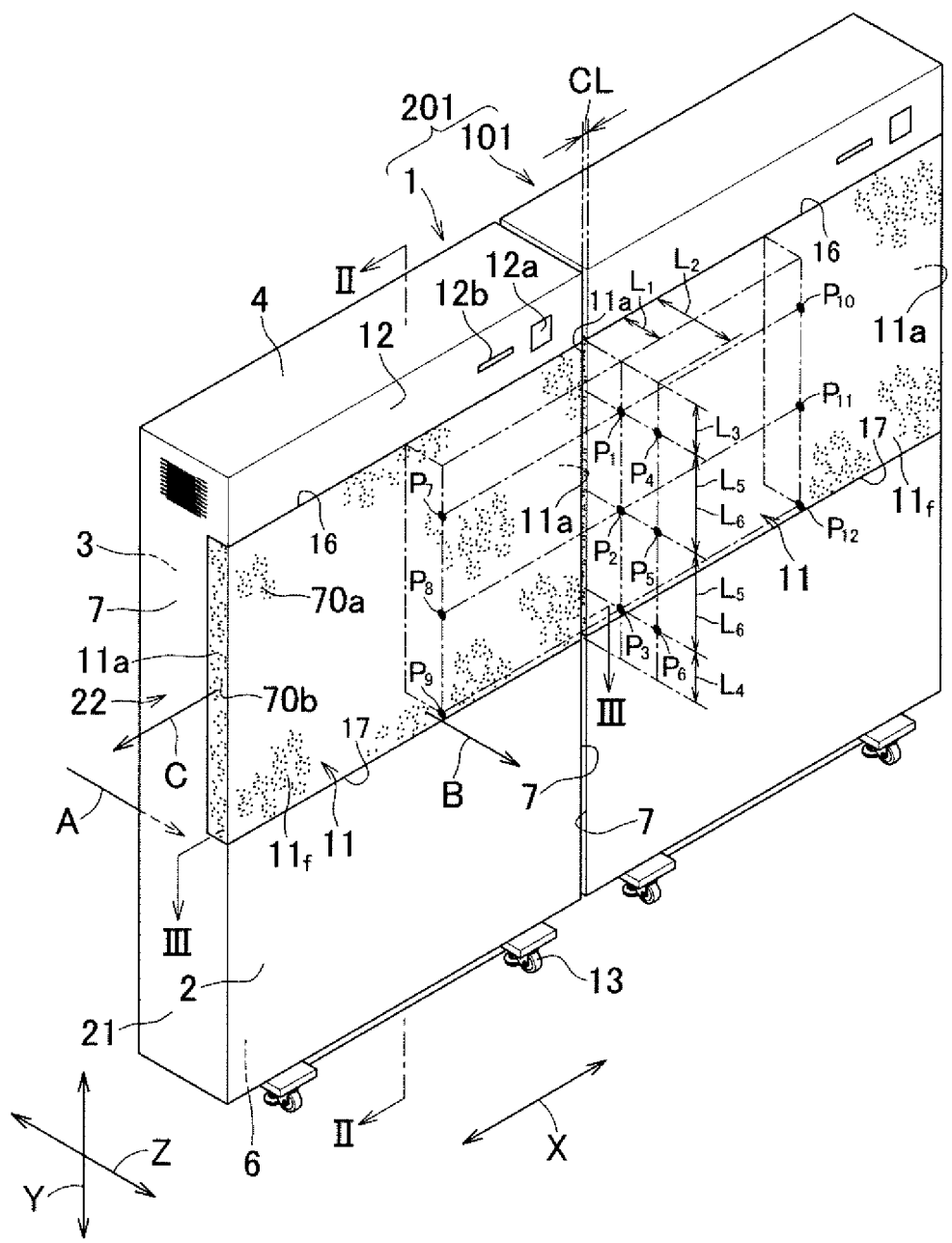
FIG. 1 is a perspective view of an air blowing device.
Figure 2:
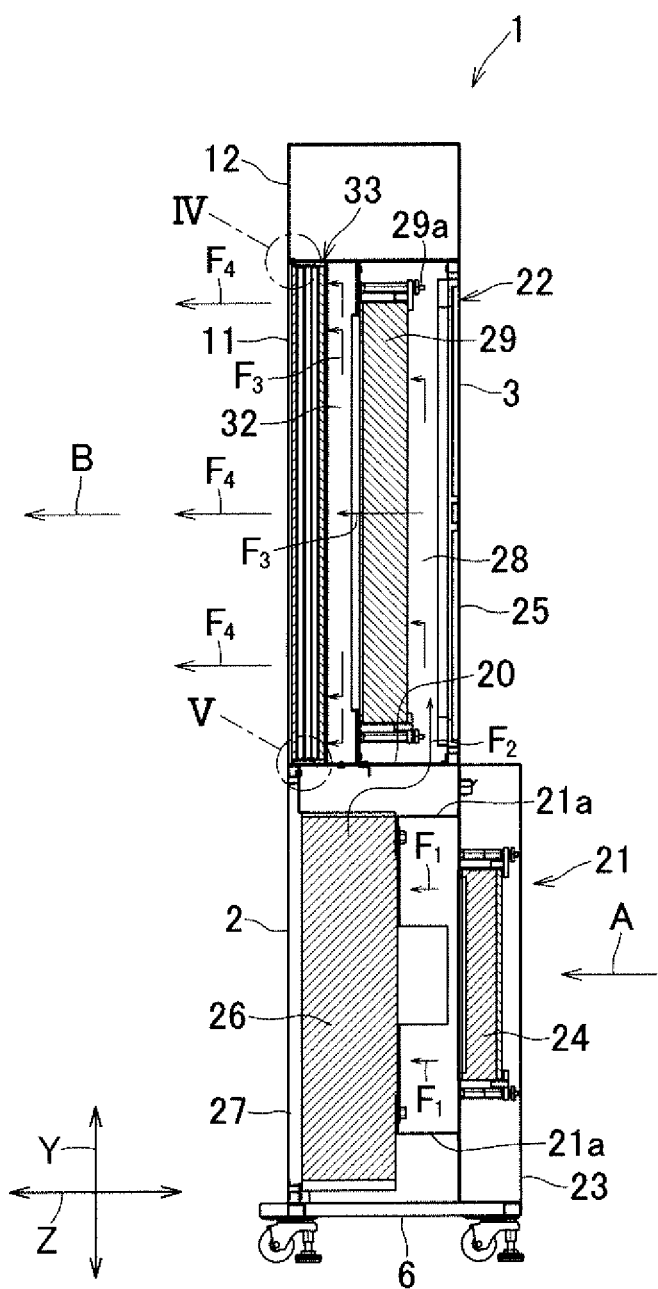
FIG. 2 is a cross-sectional view taken along line II-II shown in FIG. 1.
Figure 3:
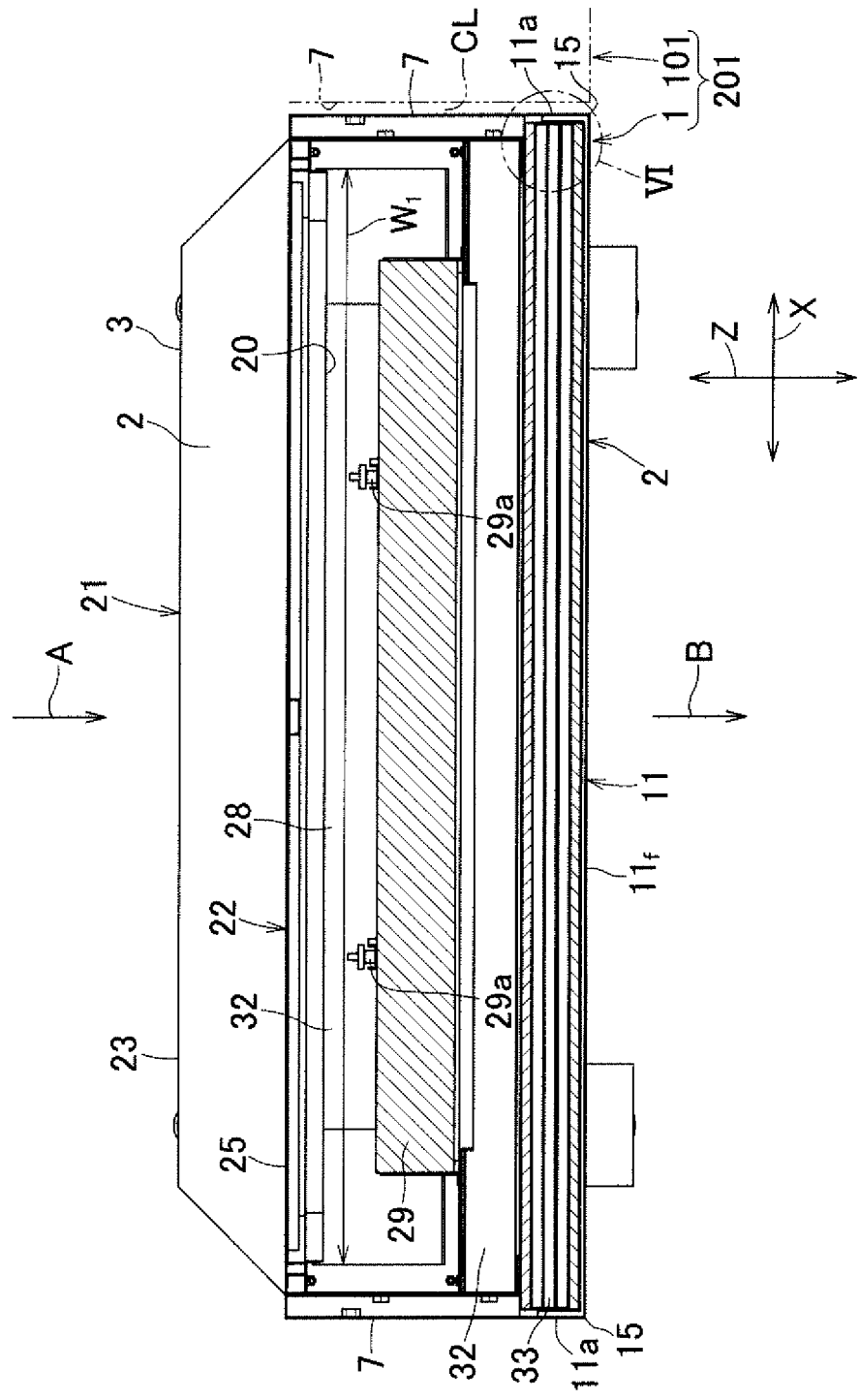
FIG. 3 is a cross-sectional view taken along line III-III shown in FIG. 1.

Referring to FIGS. 1, 2, and 3, FIG. 1 is a perspective view of an air blowing device 1, FIG. 2 is a cross-sectional view taken along line II-II shown in FIG. 1, and FIG. 3 is a cross-sectional view taken along line III-III shown in FIG. 1. In the device 1 shown in these drawings, the double-headed arrow X denotes the width direction, the double-headed arrow Y denotes the vertical direction, and the double-headed arrow Z denotes the front-rear direction. The term "forward side" associated with the device 1 is intended to mean a direction from a rear portion 3 to a front portion 2, described later.

The air blowing device 1 exemplified in FIG. 1 includes the front portion 2, the rear portion 3, a top portion 4, a bottom portion 6, and side portions 7. As viewed in the vertical direction Y, the device 1 also includes an air blowing portion 22, an operation portion 12 positioned above the air blowing portion 22, and an external-air intake portion 21 positioned below the air blowing portion 22. To the bottom portion 6, casters 13 are mounted to move the device 1.

In the device 1, air is taken in from the external-air intake portion 21 at the rear portion 3 side and blown out through a blowing plate 11 of the air blowing portion 22. The blowing plate 11 includes an air-permeable front surface 11*f* at which a plurality of first ventilation holes 70*a* are distributed, and bent portions 11*a* at which a plurality of second ventilation holes 70*b* are distributed. The first ventilation holes 70*a* blow out air to the forward side, while the second ventilation holes 70*b* blow out air outward in the width direction X. In a preferable embodiment of the device 1, the air from the first ventilation holes 70*a* is blown out in the form of a uniform flow of air. In a more preferable embodiment of the device 1, the air from the first ventilation holes 70*a* is blown out in the form of a uniform flow of air made of clean air. In the present invention, a uniform air flow will be occasionally referred to as a uniform flow of air. As used herein, the terms "uniform air flow" and "uniform flow" are synonymous with "uniform flow" recited in "Industrial Ventilation", Taro Hayashi (the Society of Heating, Air-Conditioning and Sanitary Engineers of Japan, 1982). It is noted, however, that the present invention is not intended to provide the air blowing device while specifying the air flow speed and the speed distribution. The arrows A and B shown in the drawings denote flow directions of air proceeding from the upstream side to the downstream side, and the arrow C denotes a flow direction of air proceeding from the upstream side outward in the width direction X. The front portion 2 at the operation portion 12 includes, for example, an on-off switch 12*a* that starts and stops the air blowing device 1, and an indicator portion 12*b* that monitors a clogging state of filters 24 and 29 of the device 1, described later (see FIG. 2).

FIG. 1 also shows a second air blowing device 1, which is similar to the air blowing device 1. The second air blowing device 1 is used in a state of being horizontally adjacent to the device 1 in the width direction X. It is noted, however, that in this specification, the second blowing device will occasionally be designated by reference numeral 101 for the purpose of avoiding confusion. That is, in FIG. 1, a clearance CL is defined between the side portions 7 of the air blowing device 1 and the second air blowing device 101. The devices 1 and 101 constitute a device combination 201 that is capable of, when the devices 1 and 101 are operated simultaneously, forming a large working space (not shown) at the downstream side of the devices 1 and 101 in which to form a uniform flow of air or a uniform flow of clean air.

FIG. 2 shows an internal structure of the device 1 in the vertical direction Y and a flow path of air in the device 1. The operation portion 12 accommodates therein electric wirings, circuit boards, and other elements, not shown, necessary for operating the device 1.

In FIG. 2, the external-air intake portion 21, which constitutes a lower portion of the device 1, includes an air permeable first rear-surface panel 23 at the rear portion 3 of the device 1. A removable pre-processing filter 24 is set inside the first rear-surface panel 23, that is, at the downstream side of the first rear-surface panel 23. At the downstream side of the pre-processing filter 24, a fan 26 such as a sirocco fan is set to take in external air. The fan 26 can undergo checking and replacement work by removing a front surface panel 27, which constitutes a part of the front portion 2. When the fan 26 rotates, external air passes through the first rear-surface panel 23 and the pre-processing filter 24, and forms a flow indicated by the arrow $F_1$. The air then passes through the fan 26 to form a flow indicated by the arrow $F_2$, and proceeds to the air blowing portion 22 of the device 1.

At the air blowing portion 22, the rear portion 3 is made up of a non-permeable, second rear-surface panel 25. At the upstream side of the air blowing portion 22, a first space 28 is formed to accept a flow $F_2$ of air from the external-air intake portion 21. In the downstream side of the first space 28, a removable high-end filter 29 such as a HEPA filter is set. At the downstream side of the high-end filter 29, a second space 32 is formed. The second space 32 accepts only an inflow of air past the high-end filter 29 and expands the air in the vertical direction Y and the width direction X of the device 1. At the downstream side of the second space 32, a removable rectifier unit 33 is set inboard of the air blowing portion 22. The rectifier unit 33 constitutes the rectifier mechanism of the device 1. At a position spaced apart from the rectifier unit 33 toward the downstream side by a desired distance, an air-permeable front surface 11a of the blowing plate 11 is disposed. The air-permeable front surface 11a is the last air permeable portion through which air taken into the device 1 passes, in other words, the foremost air permeable portion of the device 1. The flow $F_2$ of air turns into a flow $F_3$ at the air blowing portion 22, and the most part of the flow $F_3$ turns into a uniform air flow $F_4$ and flows out to the outside through the air-permeable front surface 11f. The flows $F_2$, $F_3$, and $F_4$ indicate the most flow paths of air in the device 1.

In FIG. 3, the size of the air blowing portion 22 in the width direction X increases in ascending order: the high-end filter 29, the second space 32, the rectifier unit 33, and the blowing plate 11. A size $W_1$ of the first space 28 in the width direction X is larger than the size of the high-end filter 29 in the width direction X. The size $W_1$ also indicates the size of an opening 20 coupled to the external-air intake portion 21. It is noted, however, that in the present invention, the above-described order in the size in the width direction X is not an essential requirement. The order may be conveniently changed. In FIG. 3, the air sent by the fan 26 of the external-air intake portion 21 turns into the flow $F_2$ and enters the first space 28 through the opening 20 (see FIG. 2). The blowing plate 11 is bent at right angles toward the rear portion 3 of the device 1 at lateral edges 15, which are positioned at both sides of the blowing plate 11 in the width direction X. Thus, the bent portions 11a are formed to extend from the lateral edges 15 toward the upstream side. The bent portions 11a each constitute a part of the corresponding side portion 7 of the device 1. The bent portions 11a extend in the vertical direction Y (see FIG. 1) to be perpendicular to a horizontal floor surface 100 (see FIG. 13), on which the device 1 is placed. Removable stops 29a are in pressure contact with the surface of the high-end filter 29 at the upstream side.

Figure 4:
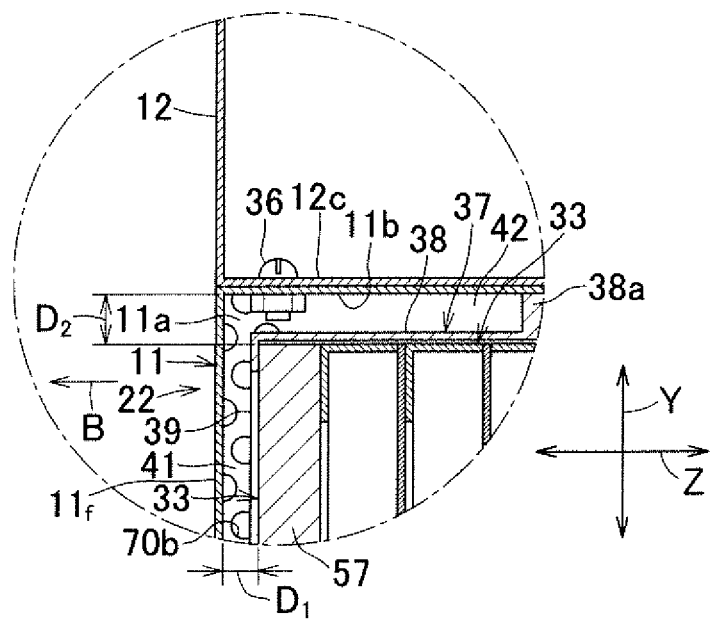
FIG. 4 is a partially enlarged view of FIG. 2.

FIG. 4 is an enlarged view of the portion indicated by IV in FIG. 2. The operation portion 12 includes a bottom plate portion 12c extending horizontally in the front-rear direction Z. In the air blowing portion 22, a top surface portion 11b extends horizontally and is coupled to the blowing plate 11, which extends perpendicularly. Thus, the top surface portion 11b defines an upper end surface portion of the air blowing portion 22. To the top surface portion 11b, the bottom plate portion 12c is secured by a bolt 36. Inboard of the air blowing portion 22, the rectifier unit 33 is fitted with and secured by a securing-purpose frame member 37. The frame member 37 includes a circumferential wall portion 38 and a forward side opening 39. The circumferential wall portion 38 has its thick portion 38a secured to the top surface portion 11b. Between the air-permeable front surface 11f of the blowing plate 11 and the frame member 37, a third space 41 is formed. Between the top surface portion 11b and the circumferential wall portion 38, a fourth space 42 is formed. A size $D_1$ of the third space 41 in the front-rear direction Z corresponds to a distance that accommodates a clearance of a desirable size between the air-permeable front surface 11f and the rectifier unit 33, specifically, between the air-permeable front surface 11f and a second honeycomb plate 57, described later, of the rectifier unit 33. A size $D_2$ of the fourth space 42 in the vertical direction Y corresponds to the distance between the top surface portion 11b and the rectifier unit 33. In a preferable embodiment of the device 1, the size $D_1$ is in the range of 5 to 100 mm, and the size $D_2$ is in the range of 0.5 to 40 mm. A possible case of the size $D_2$ being equal or close to 0.5 mm is where the top surface portion 11b and the securing-purpose frame member 37 can be brought into contact with one another without the need for the bolt 36. FIG. 4 also shows an inner surface of the bent portion 11a of the blowing plate 11, and the second ventilation holes 70b formed at the bent portions 11a.

Figure 5:
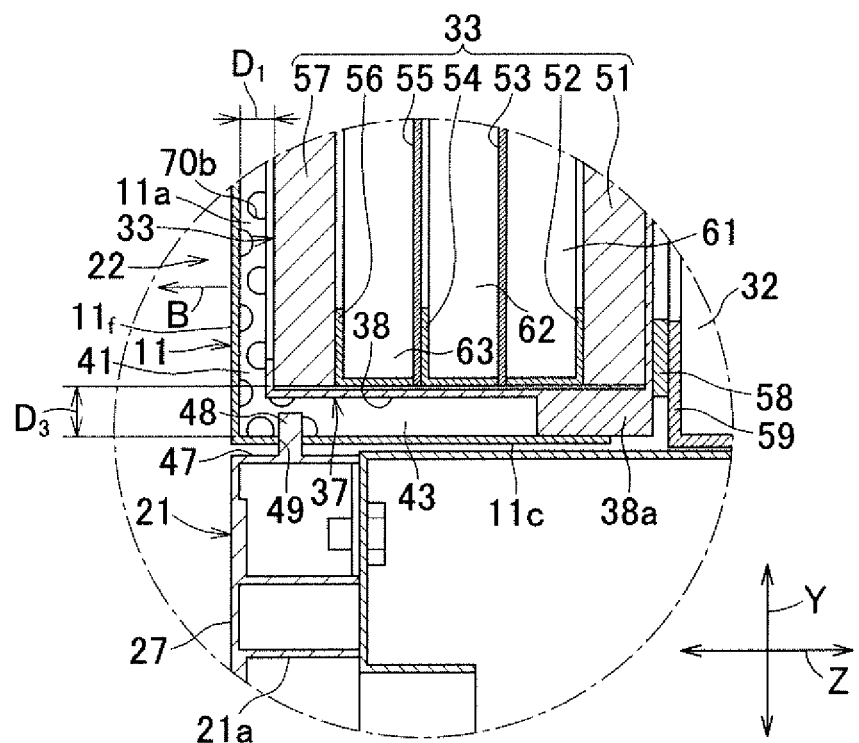
FIG. 5 is a partially enlarged view of FIG. 2.

FIG. 5 is an enlarged view of the portion indicated by V in FIG. 2. In the air blowing portion 22, a non-permeable bottom surface portion 11c extends horizontally and is coupled to the air-permeable front surface 11f, which extends perpendicularly. Thus, the bottom surface portion 11c defines a lower end surface portion of the air blowing portion 22. Between the bottom surface portion 11c and the circumferential wall portion 38 of the securing-purpose frame member 37, a fifth space 43 is formed. The fifth space 43 is coupled to the third space 41. To the inner surface of the bottom surface portion 11c, the thick portion 38a of the securing-purpose frame member 37 is secured. On the inner surface of the bent portion 11a exposed to the third space 41, the second ventilation holes 70b are formed. The external-air intake portion 21, which is positioned below the air blowing portion 22, includes the front surface panel 27 and a top plate portion 47. A pin 48 extends upward on the top plate portion 47 and enters a hole 49 of the bottom surface portion 11c at the air blowing portion 22. Thus, the pin 48 serves as means for positioning the air blowing portion 22 relative to the external-air intake portion 21. The external-air intake portion 21 accommodates therein a rib structure portion 21a for mounting the fan 26 (see FIG. 2). The structure portion 21a will not be elaborated here.

Also as shown in FIG. 5, the rectifier unit 33 includes a first honeycomb plate 51, a first spacer 52, a first punching metal 53, a second spacer 54, a second punching metal 55, a third spacer 56, and the second honeycomb plate 57, which are arranged in this order from the upstream side toward the downstream side. These members 51 to 57 are integrally held by the securing-purpose frame member 37. The securing-purpose frame member 37 is in close contact with a frame member 59 through a packing 58. The frame member 59 defines the second space 32. It is noted, however, that in the present invention, the structure of the rectifier unit 33 will not be limited to the illustrated example. The number of the honeycomb plates, the spacers, and the punching metals may be conveniently increased or decreased.

The first and second honeycomb plates 51 and 57 each have a rectifying effect relative to air flow. All of the ventilation holes (not shown) in the honeycomb structure extend in the direction from the upstream side toward the downstream side. Air past the ventilation holes proceeds straight toward the downstream side.

The first, second, and third spacers 52, 54, and 56 are frame members respectively used to form a sixth space 61 between the first honeycomb plate 51 and the first punching metal 53, a seventh space 62 between the first punching metal 53 and the second punching metal 55, and an eighth space 63 between the second punching metal 55 and the second honeycomb plate 57. The sixth, seventh, and eighth spaces 61, 62, and 63 provide spaces in which air flowing toward the downstream side is capable of expanding in the width direction X and the vertical direction Y of the device 1 at the upstream sides of the first punching metal 53, the second punching metal 55, and the second honeycomb plate 57.

The first punching metal 53 and the second punching metal 55 enable air expanding in the width direction X and the vertical direction Y to flow toward the second honeycomb plate 57.

Through the high-end filter 29, air turns into the flow $F_3$ (see FIG. 2) and enters the rectifier unit 33. The air is then blown out through the second honeycomb plate 57 to enter the third space 41, which is formed at the downstream side of the second honeycomb plate 57. In the third space 41, the air expands in the width direction X and the vertical direction Y, and the most part of the air turns into the flow $F_4$ (see FIG. 2), which is a uniform flow of clean air, and is blown out in a downstream direction B through the entire air-permeable front surface 11f of the blowing plate 11. Part of the air passes through the second ventilation holes 70b at the bent portions 11a and turns into a flow $F_5$ (see FIG. 6) to be blown out outward in the width direction X, that is, in the direction indicated by the arrow C in FIG. 1. Even though the air in the third space 41 also flows into the fourth and fifth spaces 42 and 43, since the top surface portion 11b and the bottom surface portion 11c coupled to the blowing plate 11 are non-permeable, the air at the air blowing portion 22 is blown out only through the air-permeable front surface 11f and the bent portions 11a of the blowing plate 11. A size $D_3$ of the fifth space 43 corresponds to the distance between the bottom surface portion 11c and the rectifier unit 33. In a preferable embodiment of the device 1, the size $D_3$ is in the range of 0.5 to 40 mm. A possible case of the size $D_3$ being equal or close to 0.5 mm is where the pin 48 does not enter the fifth space 43, and the bottom surface portion 11c and the rectifier unit 33 can be brought into contact with one another.

Figure 6:
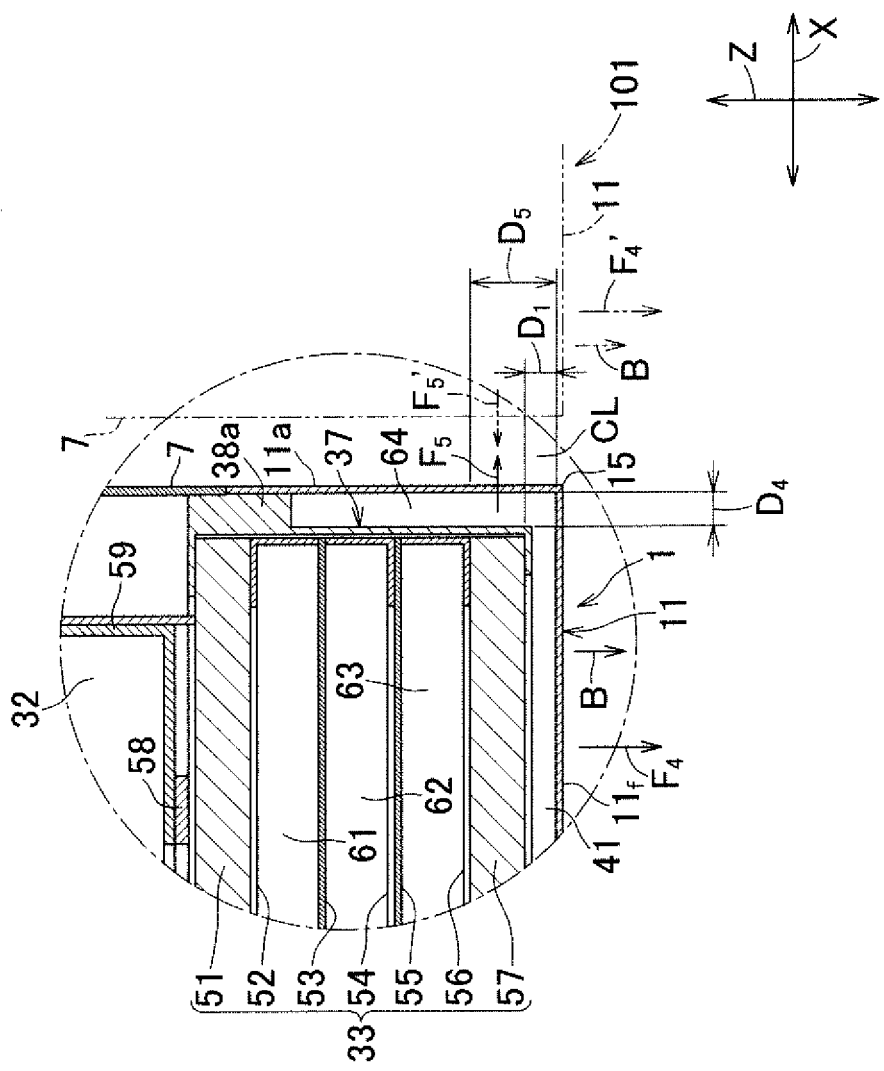
FIG. 6 is a partially enlarged view of FIG. 3.

FIG. 6 is an enlarged view of the portion indicated by VI in FIG. 3, and illustrates a structure in the vicinity of the lateral edge 15 at the air-permeable front surface 11f. In FIG. 6, the air-permeable front surface 11f, which is positioned at the downstream side of the rectifier unit 33, extends in the width direction X beyond the second honeycomb plate 57 of the rectifier unit 33 by a size $D_4$. The air past the second honeycomb plate 57 expands at least in the width direction X among the width direction X and the vertical direction Y in the third space 41, and is blown out through the entire air-permeable front surface 11f in the width direction X. A ninth space 64 is formed between the bent portion 11a, which is coupled to the air-permeable front surface 11f, and the rectifier unit 33. The ninth space 64 is coupled to the third space 41, the fourth space 42 (see FIG. 4), and the fifth space 43 (see FIG. 5). At the bent portion 11a, which is a part of the side portion 7, the second ventilation holes 70b (see FIGS. 4 and 5) are formed within the range of a size $D_5$. The air flowing into the ninth space 64 turns into the flow $F_5$. The flow $F_5$ goes out of the device 1 and proceeds to the side portion 7 of the adjacent second device 101. The upstream side of the rectifier unit 33 is in close contact with the frame member 59 through the packing 58. The size $D_4$ also indicates the distance between the bent portion 11a and the rectifier unit 33 at the ninth space 54. In a preferable embodiment of the device 1, the size $D_4$ is in the range of 0.5 to 40 mm. The size $D_5$ is preferably in the range of 1 to 40 mm, more preferably in the range of 3 to 40 mm, and further more preferably in the range of 5 to 40 mm. When the size $D_5$ is equal to or more than 3 mm, the second ventilation holes 70b are more easily formed at the bent portions 11a.

In the rectifier unit 33 of the device 1 thus formed, examples of the first and second honeycomb plates 51 and 57 each have ventilation holes in the honeycomb structure with a hole diameter in the range of 1 to 10 mm and with a ventilation hole length, in other words, a honeycomb plate thickness in the range of 3 to 30 mm. Examples of the first and second punching metals 53 and 55 include stainless steel plates and aluminum plates of 0.5 to 2.5 mm thick with uniform ventilation holes having a hole diameter of 0.5 to 4 mm and an area ratio in the range of 20 to 50%.

An example of the plate material to be formed into the blowing plate 11, which is positioned at the downstream side of the rectifier unit 33, is a 0.5 to 2.5 mm-thick metal plate such as a stainless steel plate. Another example of the metal plate is a metal perforated plate, which is generally referred to as a punching metal. The bent portions 11a, the top surface portion 11b, and the bottom surface portion 11c of the blowing plate 11 can be obtained by bending the circumference edges of the metal plate that is to be formed into the blowing plate 11. It is also possible to obtain these elements by mounting a metal plate separate from the blowing plate 11 to the circumference edges of the air-permeable front surface 11f by welding or other means. The blowing plate 11 may include only the air-permeable front surface 11f, eliminating the bent portions 11a, the top surface portion 11b, and the bottom surface portion 11c. In this case, the portions corresponding to the bent portions 11a, the top surface portion 11b, and the bottom surface portion 11c may be compensated for by conveniently changing the shapes of the side portions 7 and other portions of the air blowing portion 22 shown in FIG. 1.

The air-permeable front surface 11f of the device 1 used as a single entity or of the device 1 in the device combination 201 may be sized at, for example, 400×400 mm to 2000× 2000 mm. At the air-permeable front surface 11f, the first ventilation holes 70a, which are circular, are formed. Preferably, the hole diameter of each of the first ventilation holes 70a is kept within the range of 0.5 to 4 mm. The distance between the centers of adjacent first ventilation holes 70a is kept within the range of 1 to 6 mm. The ratio of the area of the first ventilation holes 70a to 10 cm² area of the air-permeable front surface 11f is in the range of 20 to 50%. The first ventilation holes 70a may be in a staggered arrangement or a lattice arrangement to be distributed uniformly over the air-permeable front surface 11f. It is also possible to change the hole diameter or the distance between the centers depending on which portion of the air-permeable front surface 11*f* the first ventilation holes 70*a* are to be distributed. An example of the shape of each of the first ventilation holes 70*a* is a circular shape. Other shapes than a circular shape are also possible insofar as a uniform flow of air is ensured in the device 1. From the air-permeable front surface 11*f* provided with such first ventilation holes 70*a*, air flows as the flows $F_4$ and $F_4'$ preferably at a wind speed of approximately 0.3 to 0.8 m/sec.

To describe the side portion 7, which blows out air in the width direction X, or to describe the bent portion 11*a* constituting a part of the side portion 7 by referring to the device 1 shown in FIG. 1, the size in the vertical direction Y of the range over which the second ventilation holes 70*b* are formed is preferably the same as the size of the range over which the first ventilation holes 70*a* are formed at the air-permeable front surface 11*f*. The size in the front-rear direction Z of the range over which the second ventilation holes 70*b* are formed, that is, the size $D_5$ shown in FIG. 6 is as described above. In a preferable embodiment of the second ventilation holes 70*b*, the hole diameter is in the range of 0.5 to 4 mm, the distance between the centers of adjacent second ventilation holes 70*b* is in the range of 1 to 6 mm, and the ratio of the area of the second ventilation holes 70*b* to 10 $cm^2$ area of the bent portion 11*a* is in the range of 20 to 50%. Insofar as a uniform flow of air is ensured in the device combination 201, the shape of each of the second ventilation holes 70*b* may be a circular shape or other than a circular shape. Such second ventilation holes 70*b* are preferably distributed uniformly over the bent portion 11*a*, or may be distributed locally at desirable portions. In the device combination 201, the clearance CL between the opposing bent portions 11*a* in the width direction X is preferably sized at 0.5 to 50 mm. As the size gradually increases to exceed 50 mm, the cleanliness of the downstream side of the clearance CL, described later, degrades gradually notably.

The device 1 according to the present invention may be used not only as a blowing device, but also as a blowing device made up of two opposing blowing devices to provide an open clean zone, or as a single blowing device of a push-pull ventilator where the blowing device is opposed to a single suction device. The device 1 may also be used in the device combination 201, where the device 1 and the second device 101 similar to the device 1 are arranged horizontally as shown in FIGS. 1 and 6, that is, aligned in the width direction X with a certain gap between the devices in the device combination 201, the bent portion 11*a* of the device 1 and the bent portion 11*a* of the device 101 adjacent to the device 1 are opposed to each other with the clearance CL of desirable size between the bent portions 11*a*. Between the device 1 and the device 101 aligned and spaced apart from each other in the width direction X, the bent portions 11*a* opposed to each other in the width direction X may blow out air from a part of each of the bent portions 11*a*, specifically, from the portion with the size $D_5$.

When the device 1 and the device 101 of such device combination 201 are operated simultaneously, the air-permeable front surface 11*f* of the device 1 and the air-permeable front surface 11*f* of the device 101 respectively generate the uniform air flows $F_4$ and $F_4'$ (see FIG. 6) in the downstream direction B. The bent portion 11*a* and the bent portion 11*a* opposed to each other in the width direction X respectively generate air flows $F_5$ and $F_5'$ (see FIG. 6), each of which is directed to the opposing bent portion 11*a*. The flows $F_5$ and $F_5'$ collide with each other at the clearance CL.

Figure 7:
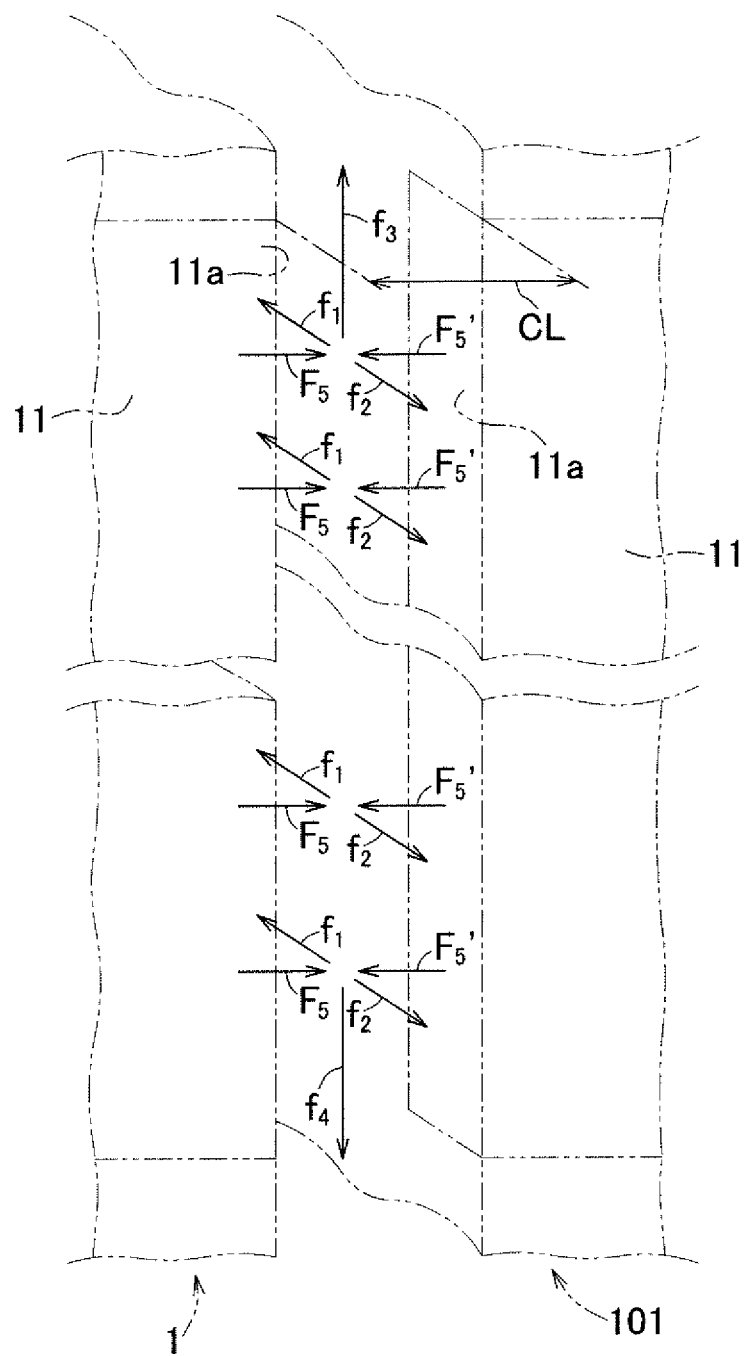
FIG. 7 schematically illustrates a flow of air at a clearance.

FIG. 7 schematically illustrates collision of the air flows $F_5$ and $F_5'$. In FIG. 7, when the flows $F_5$ and $F_5'$ collide with each other, the air constituting the flows $F_5$ and $F_5'$ divides the clearance CL into its upstream side and downstream side. Also in the clearance CL, the air forms air flows $f_1$, $f_2$, $f_3$, $f_4$, and so forth, extending radially toward the upstream side, toward the downstream side, upward, downward, and other directions. If the device 1 and the device 101 only generate the flows $F_4$ and $F_4'$, suspended particles in the space of the working chamber where the device 1 and the device 101 are installed or in other space can turn into dust and enter the clearance CL from the upstream side along with the air in the chamber. The dust can then flow to the downstream side of the device 1 and the device 101, and contaminate the working space through which clean air is to flow at the forward side of the device 1 and the device 101. However, with the flows $f_1$, $f_2$, $f_3$, and $f_4$ in the clearance CL, the flows f1, $f_3$, and $f_4$ among them block entrance of the air containing the suspended particles into the clearance CL, thereby solving the contamination problem caused by the suspended particles in the working space at the forward side of the clearance CL. The flow $f_2$ is made of clean air past the high-end filter 29 and proceeds to the downstream side from the clearance CL. Thus, the flow $f_2$ enables the formation of the working space through which clean air flows at the forward side of the clearance CL. At the same time, the existence of the flows $F_4$ and $F_4'$ makes the working space through which clean air flows occupy the entire area of the device combination 201 in the width direction X, including the forward side of the clearance CL. Additionally, a uniform flow of clean air is ensured in the working space.

In the device combination 201, a spacer (not shown) is preferably interposed between the device 1 and the device 101 and used to fix the device 1 and the device 101. This is for the purpose of keeping the size of the clearance CL stable during use of the device combination 201. It is also possible to use fixtures common to the device 1 and the device 101 so as to keep the size of the clearance CL stable.

Figure 8:
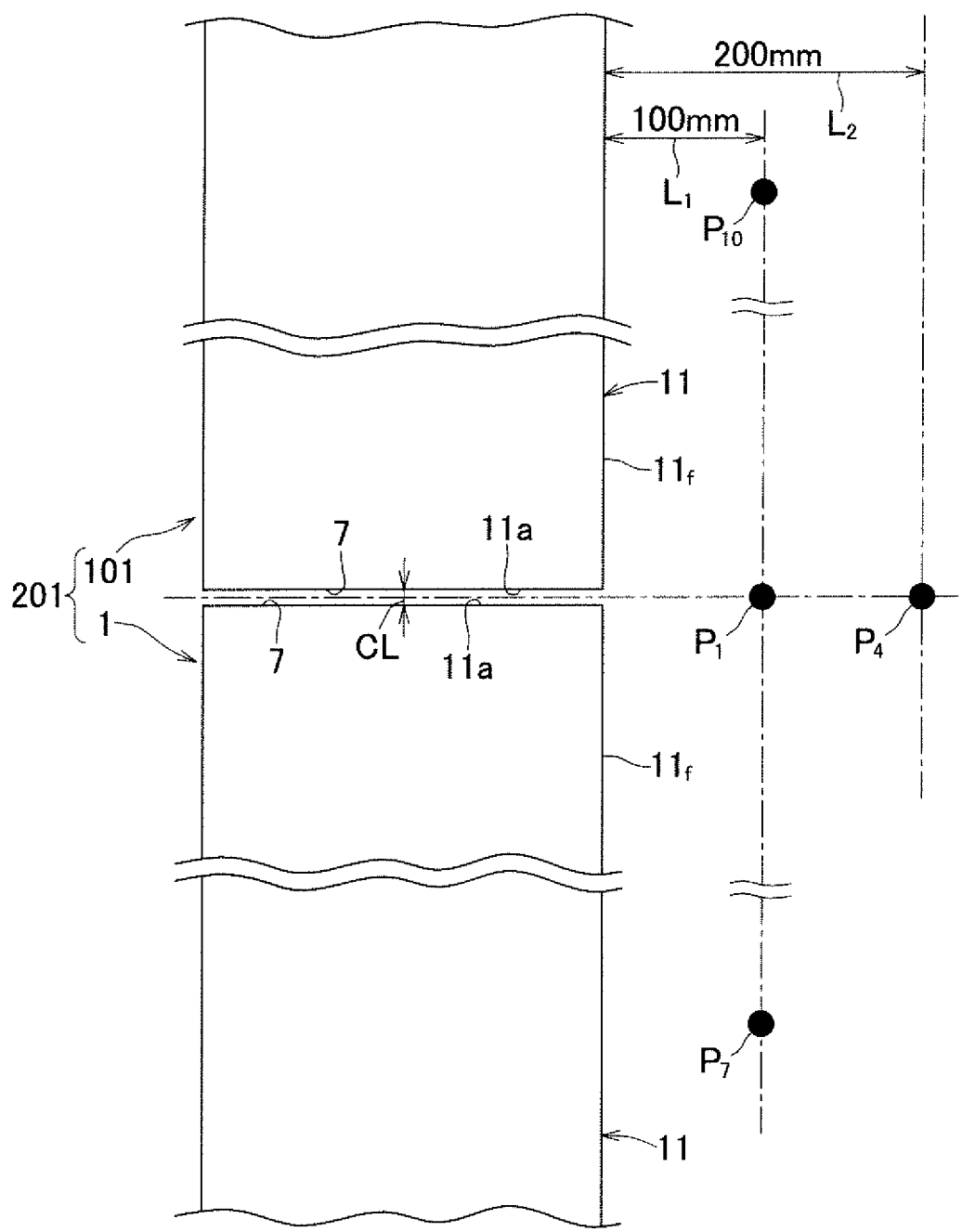
FIG. 8 illustrates measurement points of wind speed and cleanliness.

FIG. 8 is a plan view of a part of the device combination 201 installed in a laboratory (not shown) where the device combination 201 is evaluated for its performance. FIG. 8 illustrates some measurement points, namely $P_1$ and $P_4$ (also refer to FIG. 1), of a plurality of measurement points at which the concentration of the suspended particles in air at the downstream side of the clearance CL is measured. FIG. 8 also illustrates some wind speed measurement points, namely $P_1$, $P_7$, and $P_{10}$, of a plurality of wind speed measurement points at which wind speed distribution is observed at the downstream side of the device 1 and the device 101 constituting the device combination 201. In the exemplary device combination 201, all of the measurement points $P_1$ to $P_{12}$ employed to measure the suspended particle concentration and the wind speed are shown in FIG. 1.

In the two devices 1 and 101 of the device combination 201 shown in FIG. 8, the air-permeable front surface 11*f* is sized at 900-mm width×700-mm height, the fan 26 is capable of providing a blowing wind speed of approximately 0.5 m/sec through the air-permeable front surface 11*f*, and the high-end filter 29 (see FIG. 2) is a HEPA filter of 99.97% collection efficiency with respect to particles of 0.3 μm. The two devices 1 and 101 are aligned with their respective air-permeable front surfaces 11*f* positioned on the same vertical plane. The clearance CL between the device 1 and the device 101 is set at 10 mm. As shown in FIG. 1, the measurement points $P_1$ to $P_3$ positioned at the forward side of the clearance CL are points at which to measure the wind speed. The measurement points $P_1$ to $P_6$ are points at which to measure the suspended particle concentration. All of these points are on a line that divides the width of the clearance CL. The measurement points $P_1$ to $P_3$ are at a position that is spaced apart from the air-permeable front surface 11f to the downstream side by a distance $L_1$ of 100 mm. $L_{10}$ The measurement points $P_4$ to $P_6$ are at a position that is spaced apart from the air-permeable front surface 11f to the downstream side by a distance $L_2$ of 200 mm. The measurement points $P_1$ and $P_4$ are at a position that is spaced apart from a top edge 16 (see FIG. 1) of the air-permeable front surface 11f by a distance $L_3$ of 118 mm. The measurement points $P_3$ and $P_6$ are at a position that is spaced apart from a bottom edge 17 (see FIG. 1) of the air-permeable front surface 11f by a distance $L_4$ of 118 mm. An intermediate distance $L_5$ of the measurement points $P_1$, $P_2$, and $P_3$, and an intermediate distance $L_6$ of the measurement points $P_4$, $P_5$, and $P_6$ are each set at 232 mm.

The measurement points $P_7$, $P_8$, and $P_9$ and the measurement points $P_{10}$, $P_{11}$, and $P_{12}$ shown in FIG. 1 are points at which to measure the wind speed. The measurement points $P_7$, $P_8$, and $P_9$ respectively correspond to the measurement points $P_1$, $P_2$, and $P_3$ moved horizontally to the center of the air-permeable front surface 11f of the device 1 in the width direction X. The measurement points $P_{10}$, $P_{11}$, and $P_{12}$ respectively correspond to the measurement points $P_1$, $P_2$, and $P_3$ moved horizontally to the center of the air-permeable front surface 11f of the device 101 in the width direction X. The wind speed was measured using Model 1560, available from KANOMAX, and the suspended particle concentration was measured using Particle Counter KC-18, available from LION.

The results of measurement of the wind speed are as shown in Table 1, and the results of measurement of the suspended particle concentration are as shown in Tables 2 and 3. Table 2 shows the results of measurement for particles having a particle diameter of equal to or more than 0.3 μm. Table 3 shows the results of measurement for particles having a particle diameter of equal to or more than 0.1 μm. As used in Tables 2 and 3, "Suspended particle concentration $C_0$ at the upstream side of the device combination" means a concentration (particle/m³) obtained by sampling 1 L of air in the chamber at the upstream side of the pre-processing filter 24 (see FIG. 2) of one of the two devices 1 and 101, followed by converting the number of the suspended particles in the air into a number per 1 m³. The term "cleanliness Q" refers to a value obtained by Formula 1 provided below.

$$\text{Cleanliness } Q\,(\%) = (C_0 - C_P)/C_0 \times 100 \quad \text{(Formula 1)}$$

where $C_0$: suspended particle concentration at the upstream side of the device combination (particle/m³),
$C_P$: suspended particle concentration at measurement point P (particle/m³)

As an object to be compared with the measurement results of the device combination 201, a comparative device combination was prepared. In the comparative device combination, the device 1 and the device 101 were mutually similar, two blowing devices (not shown) with no second ventilation holes 70b formed at the respective bent portions 11a. The two blowing devices were installed in the comparative device combination in a manner similar to the device 1 and the device 101 of the device combination 201. The comparative device combination was subjected to measurement of the suspended particle concentration in the air under the same conditions as in the device combination 201. The results of measurement of the comparative device combination are shown in the comparative example category of Tables 2 and 3.

TABLE 1

| Distribution of the wind speed (m/sec) | | | | | |
|---|---|---|---|---|---|
| $P_7$ | 0.58 | $P_1$ | 0.54 | $P_{10}$ | 0.60 |
| $P_8$ | 0.56 | $P_2$ | 0.51 | $P_{11}$ | 0.54 |
| $P_9$ | 0.56 | $P_3$ | 0.52 | $P_{12}$ | 0.57 |

(Note)
Average wind speed: 0.55 m/sec.

TABLE 2

| | Concentration of suspended particles having a particle diameter of equal to or more than 0.3 μm | | | | |
|---|---|---|---|---|---|
| | Examples Suspended particle concentration (particle/m³) | | | Comparative examples Suspended particle concentration (particle/m³) | | |
| Measurement points P | $C_P$ | Cleanliness Q (%) | Suspended particle concentration $C_0$ at the upstream side of the device combination | $C_P$ | Cleanliness Q (%) | Suspended particle concentration $C_0$ at the upstream side of the device combination |
| $P_1$ | 0 | Equal to or more than 99.97 | 11472 | 107 | 99 11 | 12044 |
| $P_2$ | 1 | Equal to or more than 99.97 | | 11 | 99 91 | |
| $P_3$ | 0 | Equal to or more than 99.97 | | 418 | 96.53 | |
| $P_4$ | 3 | Equal to or more than 99.97 | | 32 | 99.73 | |
| $P_5$ | 1 | Equal to or more than 99.97 | | 15 | 99.58 | |
| $P_6$ | 4 | Equal to or more than 99.97 | | 157 | 98.70 | |

TABLE 3

Concentration of suspended particles having a particle diameter of equal to or more than 0.1 μm

| | Examples Suspended particle concentration (particle/m³) | | | Comparative examples Suspended particle concentration (particle/m³) | | |
|---|---|---|---|---|---|---|
| Measurement points P | $C_P$ | Cleanliness Q (%) | Suspended particle concentration $C_0$ at the upstream side of the device combination | $C_P$ | Cleanliness Q (%) | Suspended particle concentration $C_0$ at the upstream side of the device combination |
| $P_1$ | 42 | 99.97 | 161065 | 2399 | 98.33 | 143990 |
| $P_2$ | 76 | 99.95 | | 133 | 99.91 | |
| $P_3$ | 89 | 99.95 | | 5338 | 96.29 | |
| $P_4$ | 79 | 99.95 | | 494 | 99.66 | |
| $P_5$ | 35 | 99.98 | | 258 | 99.82 | |
| $P_6$ | 155 | 99.90 | | 2435 | 98.31 | |

Figure 9:
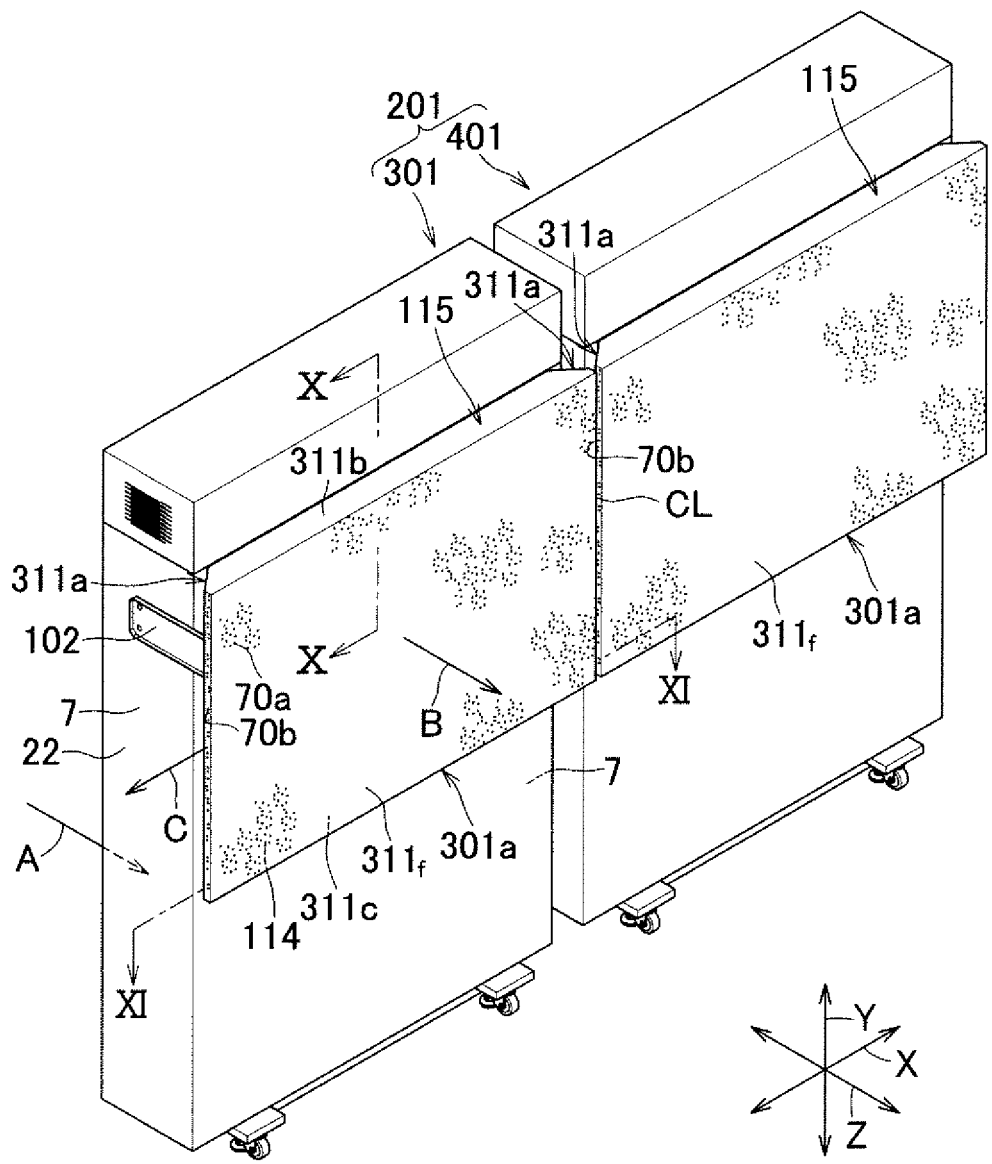
FIG. 9 is a similar view to FIG. 1, illustrating one embodiment.

FIG. 9 is a similar view to FIG. 1, illustrating one embodiment. In this embodiment, the device combination 201 is made up of a device 301 and a device 401. The device 301 and the device 401 are similar to each other. In the device 301 and the device 401, the blowing plate 11 shown in FIG. 1 is replaced with an extended blowing unit 301a at the downstream side of the rectifier unit 33 (see FIG. 10). The extended blowing unit 301a is in a removable state or a non-removable state relative to the air blowing portion 22. It is noted, however, that in the illustrated example, the unit 301a is removably secured to the side portions 7 of the air blowing portion 22 through arms 102 extending rearward. The unit 301a includes an air-permeable front surface 311f and a spacer 115 positioned between the air-permeable front surface 311f and the air blowing portion 22. The air-permeable front surface 311f and the spacer 115 are integral with each other in a mutually removable state or a mutually non-removable state. The spacer 115 includes side wall portions 311a that are air permeable at least partially, a non-permeable top surface portion 311b, and a non-permeable bottom surface portion 311c. In the device 301 and the device 401, the side wall portions 311a extend from the lateral edges of the air-permeable front surface 311f toward the upstream side and are assumed as parts of the side portions of the devices 301 and 401.

Figure 10:
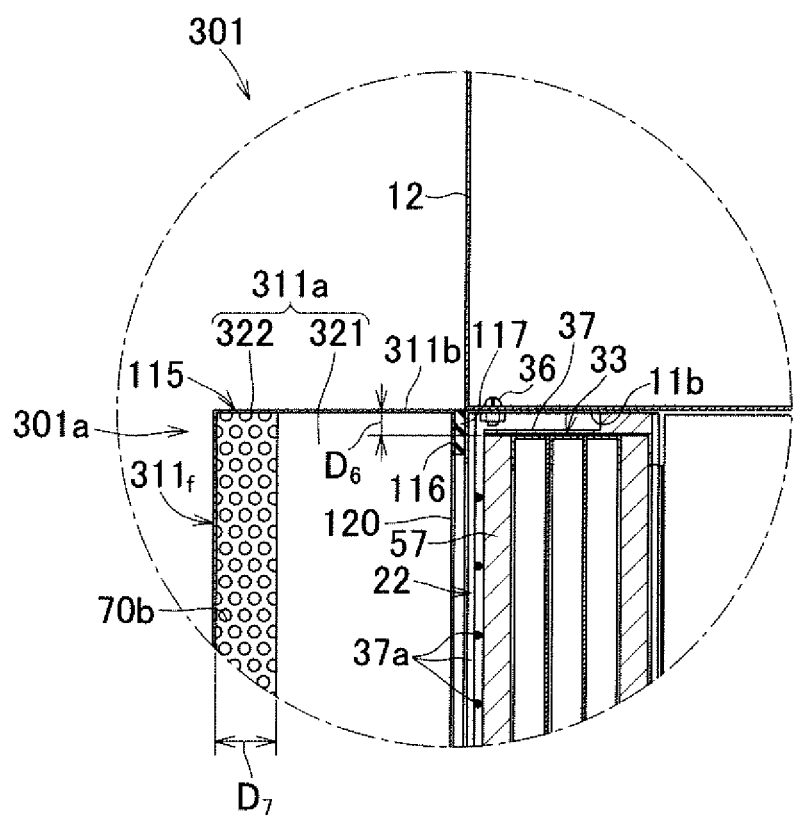
FIG. 10 is a cross-sectional view taken along line X-X shown in FIG. 9.

FIG. 10 is a cross-sectional view taken along line X-X shown in FIG. 9. The air blowing portion 22 is formed under the operation portion 12, whose internal structure is not shown. At the downstream side of the air blowing portion 22, the extended blowing unit 301a is set. The spacer 115 of the unit 301a includes an opening 120 facing the air blowing portion 22. A non-permeable packing 117 is interposed between a circumferential edge portion 116 of the opening 120 and the air blowing portion 22. The unit 301a is hollow in its interior, and the top surface portion 311b, which is a part of the spacer 115, is positioned above the rectifier unit 33. Between the top surface portion 311b and the rectifier unit 33, there is a distance equivalent to a size $D_6$. In a preferable embodiment of the unit 301a, the size $D_6$ is in the range of 0 to 40 mm. The case of the size $D_6$ being equal or close to 0 mm is where a top plate portion 113 and the securing-purpose frame member 37 are approximately at the same level. It is noted, however, that the present invention can also be implemented in such an embodiment that the top surface portion 311b is disposed below the top portion of the rectifier unit 33 when seen in the drawings. The side wall portions 311a of the spacer 115 will be described later based on FIGS. 11 and 12. In FIG. 10, the securing-purpose frame member 37 used in the rectifier unit 33 is different from the one shown in FIG. 4 in that the securing-purpose frame member 37 does not extend to contact the downstream side surface of the second honeycomb plate 57, that is, its front surface. On the downstream side surface, a plurality of metal line materials 37a each of 0.5 to 3 mm in diameter are disposed in lattice arrangement, thereby supporting the second honeycomb plate 57 from the downstream side. It is noted, however, that the securing-purpose frame member 37 according to the embodiment of FIG. 10 may be replaced with the securing-purpose frame member 37 according to the embodiment of FIG. 4.

Figure 11:
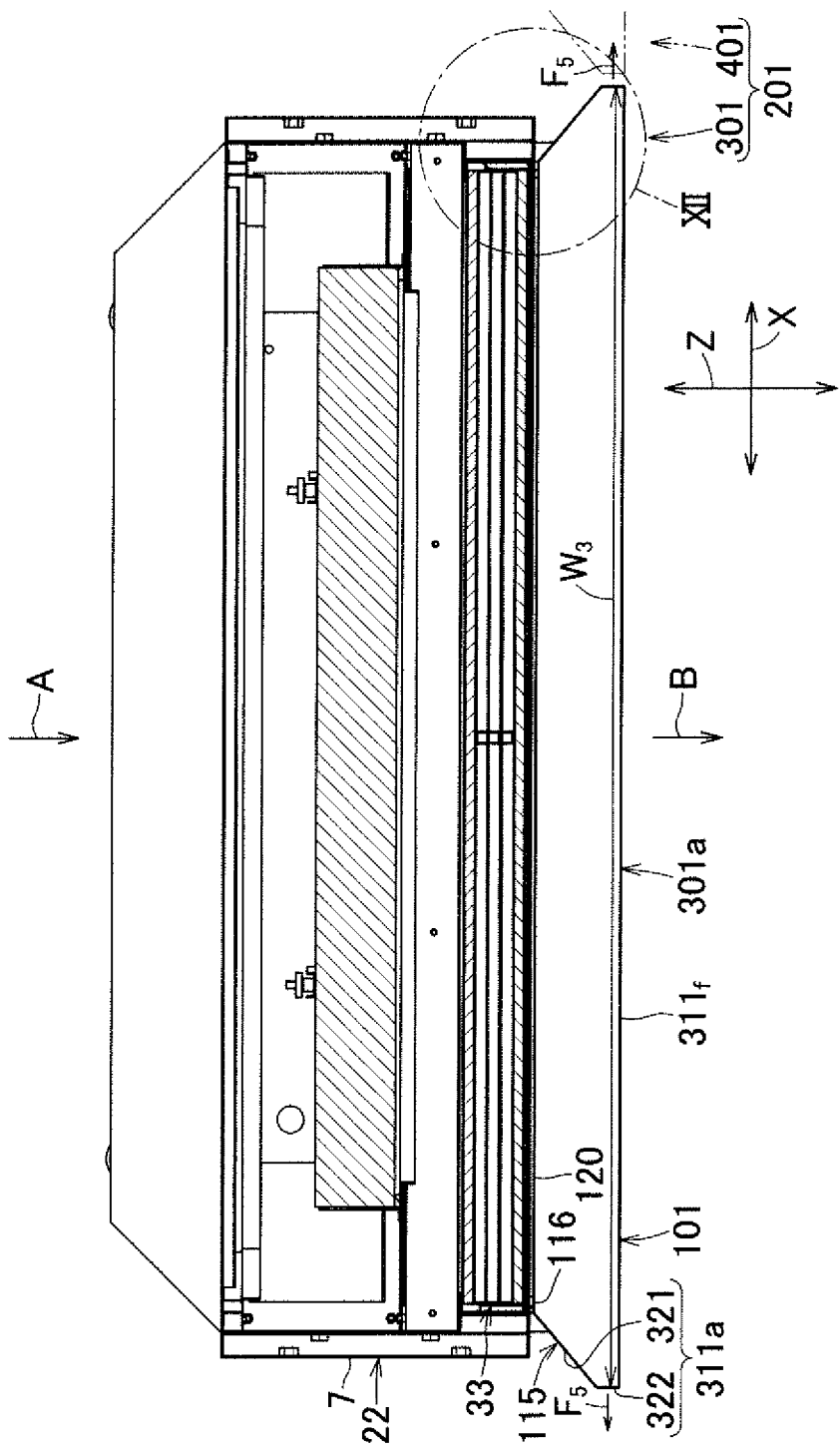
FIG. 11 is a cross-sectional view taken along line XI-XI shown in FIG. 9.

FIG. 11 is a cross-sectional view taken along line XI-XI shown in FIG. 9. The side wall portions 311a of the spacer 115 each include: a first portion 321 that is positioned at the forward side of the rectifier unit 33 and that gradually increases an inner size $W_3$ in the width direction; and a second portion 322 that extends from the front end of the first portion 321 toward the downstream direction B and that is orthogonal to the air-permeable front surface 311f. The first portion 321 is non-permeable and has the circumferential edge portion 116 at the upstream side. The circumferential edge portion 116 at least defines the opening 120, which has the same width as the width of the front surface of the rectifier unit 33. The second portion 322 is air permeable in the range of a size $D_7$ (see FIGS. 10 and 12), and includes a plurality of the second ventilation holes 70b (see FIG. 10b). The second ventilation holes 70b are capable of blowing out air outward in the width direction X from inside the unit 301, thereby forming the air flow $F_5$. The second ventilation holes 70b of the second portion 322 are similar to the second ventilation holes 70b shown in FIG. 1 in respect of the hole diameter, the distance between the centers, and operation. The size $D_7$ (see FIGS. 10 and 12) of the second portion 322 are similar to the size $D_5$ shown in FIG. 6.

Figure 12:
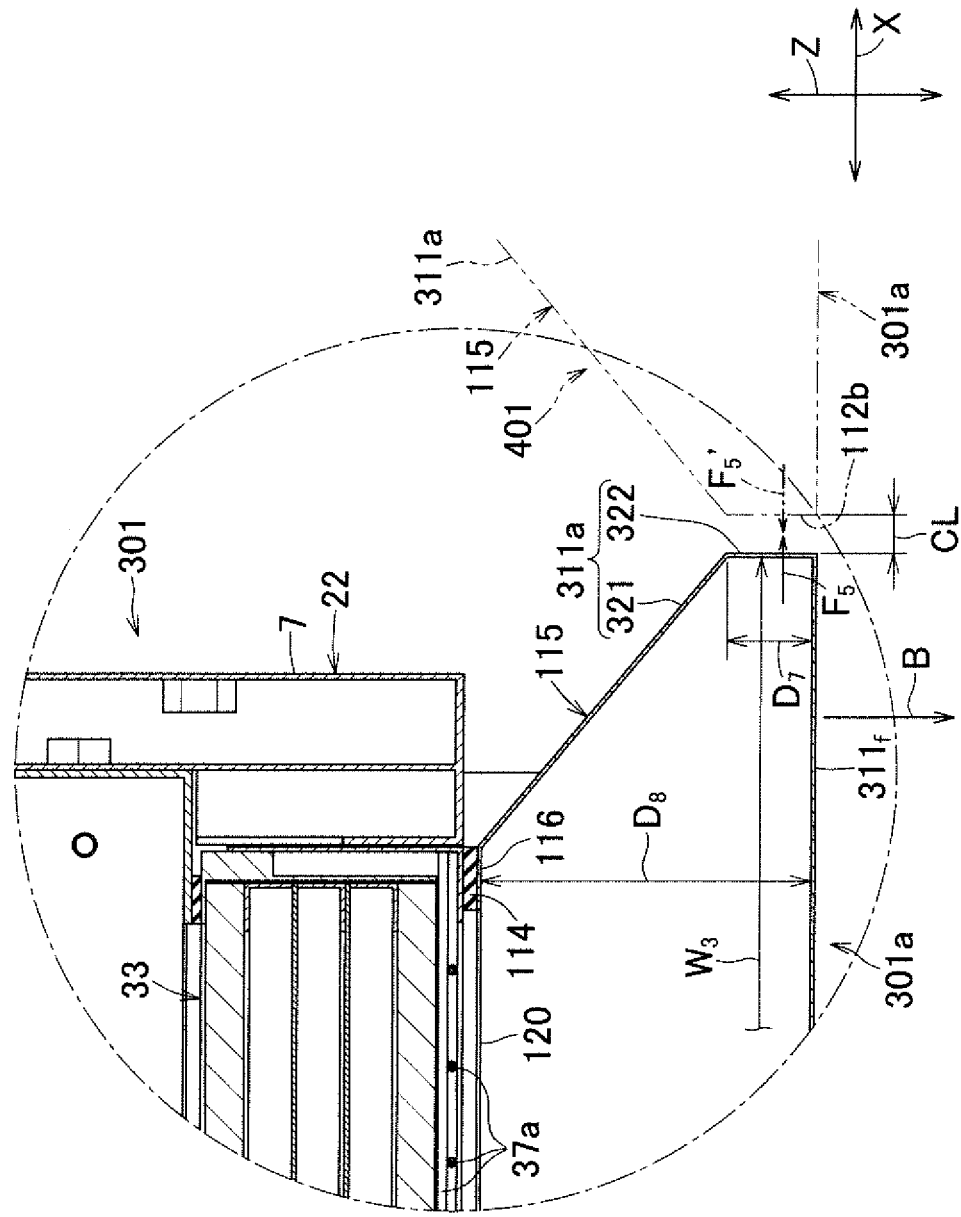
FIG. 12 is a partially enlarged view of FIG. 11.

FIG. 12 is an enlarged view of the portion indicated by XII in FIG. 11. In the unit 301a of the device 301, the first portions 321 of the side wall portions 311a extend obliquely to the downstream direction B beyond the side portions 7 of the blowing portion 22 in the width direction X. Thus, the inner size $W_3$ at the second portions 322 is larger than the size between the side portions 7 of the air blowing portion 22. The unit 301a provided with the spacer 115 wide in the width direction X as described above is capable of expanding air from the rectifier unit 33 at least in the width direction X of the rectifier unit 33 among the width direction X and the vertical direction Y. In the two devices 301 and 401 shown in FIG. 9, where the units 301a having the inner size $W_3$ in the illustrated example are used, the second portions 322 of the opposing side wall portions 311a define a clearance CL. The device 301 according to the present invention may be replaced with such an embodiment that the first portions 321 do not exceed the side portions 7 of the air blowing portion 22 in the width direction X.

At the second portion 322 of the spacer 115 of the device 301, air is blown out outward in the width direction X through the plurality of second ventilation holes 70b formed in the range of the size $D_7$ to form the air flow $F_5$. At the second portion 322 (see FIG. 12) of the spacer 115 of the device 401, air is blown out outward in the width direction X through two ventilation holes (not shown) to form an air flow $F_5'$. The air flows $F_5$ and $F_5'$ collide with each other as exemplified in FIG. 7. This prevents entrance of air containing a large number of suspended particles into the clearance CL from the upstream side of the device 301 and the device 401, while at the same time supplying to the downstream side of the clearance CL clean air filtered through the high-end filter 29.

In the unit 301a thus used, when the unit 301a is sized at approximately 400 to 2000 mm in the width direction X and the vertical direction Z, the inner size $W_3$ between the second portions 322 of the spacer 115 is preferably greater than the width of the rectifier unit 33 by 20 to 100 mm at both sides of the rectifier unit 33. A size $D_8$ in the front-rear direction Z of the unit 301a is preferably 20 to 150 mm.

Figure 13:
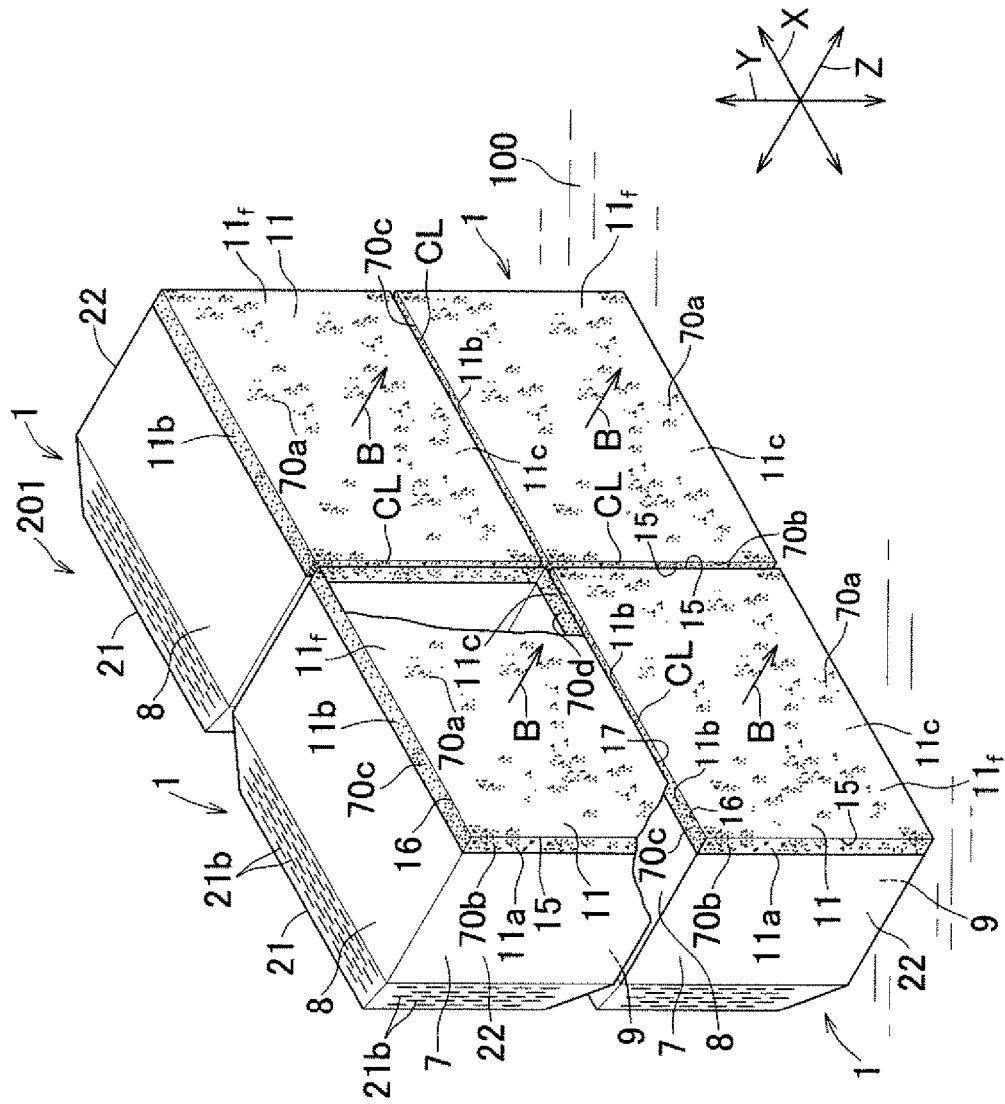
FIG. 13 is a similar view to FIG. 1, illustrating one embodiment.

FIG. 13 is also a similar view to FIG. 1, illustrating one embodiment of the present invention. In FIG. 13, the device combination 201 of blowing devices are made up of four devices 1 installed on the floor surface 100 and aligned in the width direction X and the vertical direction Y. A device 1 among the devices 1 is shown in its partially cut-away view. It is noted, however, that the internal structure of the cut-away device 1 is not shown to facilitate the understanding of the shapes of the bent portion 11a, the top surface portion 11b, and other elements.

Each of the devices 1 has the external-air intake portion 21 formed at the upstream side of the air blowing portion 22, and air-intake holes 21b of the external-air intake portion 21 are shown. The air blowing portion 22 includes: an air-permeable front surface 11f of the blowing plate 11 at which first ventilation holes 70a are formed; and bent portions 11a, a top surface portion 11b, and a bottom surface portion 11c respectively coupled to lateral edges 15, a top edge 16, and a bottom edge 17 of the air-permeable front surface 11f. The bent portions 11a, the top surface portion 11b, and the bottom surface portion 11c respectively have a plurality of second ventilation holes 70b, a plurality of third ventilation holes 70c, and a plurality of fourth ventilation hole 70d. The hole diameter of each of the second to fourth ventilation holes 70b to 70d and the distance between the centers of the respective ventilation holes are respectively similar to the hole diameter and the distance between the centers of the second ventilation holes 70b shown in FIG. 1. It is noted, however, that in the device combination 201 shown in FIG. 13, the devices 1 can be implemented to ensure that air is blown out through all of the bent portions 11a, all of the top surface portions 11b, and all of the bottom surface portions 11c of the four devices 1. Alternatively, the devices 1 can be implemented to ensure that air is blown out only through a desired portion among the bent portions 11a, the top surface portions 11b, and the bottom surface portions 11c. For example, when the device combination 201 uses only two devices 1 aligned in the vertical direction Y, one device 1 among the devices 1 may be implemented to blow air through the top surface portion 11b, while the other device 1 may be implemented to blow air through the bottom surface portion 11c. Thus, the air from the top surface portion 11b and the air from the bottom surface portion 11c collide with each other.

Also in the four devices 1 shown in FIG. 13, a clearance CL is formed between the bent portions 11a opposed to each other in the width direction X, and a clearance CL is formed between the top surface portion 11b and the bottom surface portion 11c opposed to each other in the vertical direction Y. The size of each of the clearances CL is in a similar range to the range of the size of the clearance CL shown in FIG. 1. In the combination 201 thus formed, a working space for a uniform flow of air or a uniform flow of clean air is formed at the forward side of each of the clearances CL. A spacer to form the clearance CL is used between the devices 1 aligned in the width direction X, and a spacer to form the clearance CL is used between the devices 1 aligned in the vertical direction Y. These spacers are not shown. Each spacer may be prepared as a separate entity from the device 1. It is also possible to prepare each spacer by protruding a part of the device 1 outward in the width direction X or outward in the vertical direction Z.

The blowing devices 1, 101, 301, and 401 according to the above-exemplified embodiments have been illustrated as including the high-end filter 29 such as a HEPA filter. Thus, these blowing devices form a working space for a uniform flow of clean air at the downstream side of the plurality of blowing devices aligned in the width direction X and/or the vertical direction Y. These blowing devices, therefore, are suitable as blowing devices of push-push blowing devices to form a clean zone. It is noted, however, that in the present invention, the use of the high-end filter 29 is not an essential condition. The present invention will also find applications in blowing devices without the high-end filter 29. In this case, the plurality of blowing devices will form a working space for a uniform flow of air at the downstream side of the blowing devices aligned in the width direction X and/or the vertical direction Y. In this case, the blowing devices are suitable as blowing devices of push-pull ventilators to supply a uniform flow of air over a large space.

Figure 14:
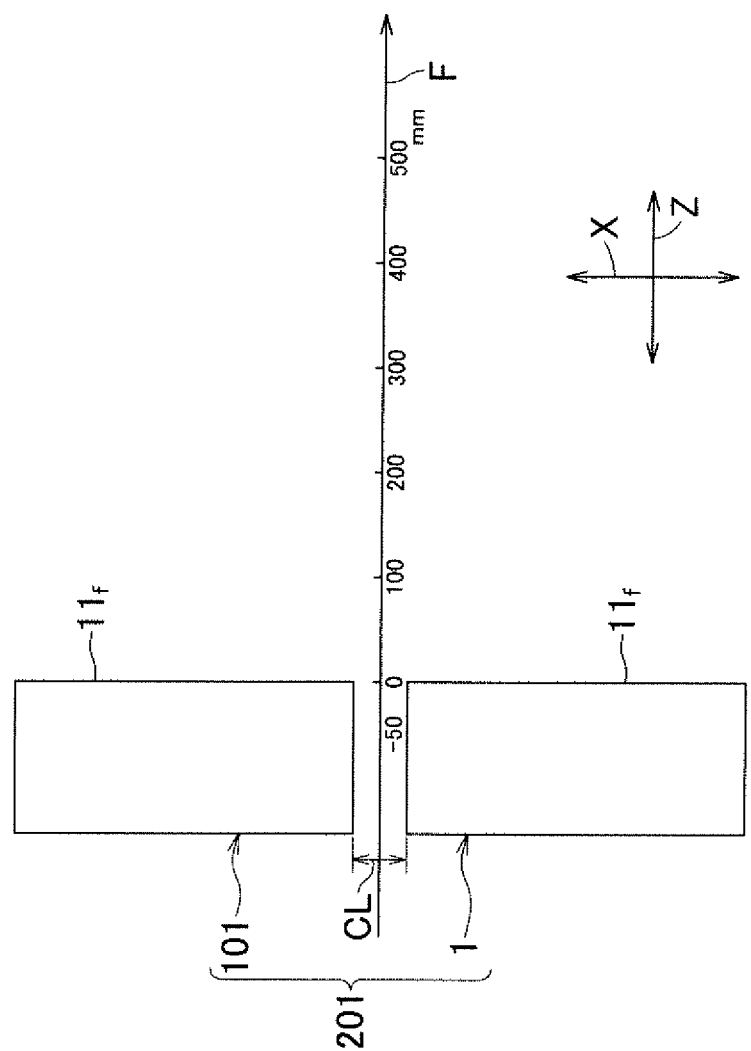
FIG. 14 is a plan view of an exemplary device combination.

FIG. 14 is a plan view of an exemplary device combination 201 used for performance evaluation. While the device combination 201 of the illustrated example includes a device 1 and a device 101 similar to those shown in FIG. 8, the air-permeable front surfaces 11f of the respective device 1 and device 101 are sized at 1050 mm width×850 mm height. The clearance CL can be set at any size necessary in the relationship with the working space by the device combination 201. Still, in the performance evaluation, the size was set in five stages, namely 10, 20, 30, 40, and 50 mm. The other conditions of the configuration are similar to those of the devices 1 and 101 shown in FIG. 8, such as the blowing wind speed (0.5 m/sec) at the center portion of the air-permeable front surface 11f, and the collection efficiency (99.97%) of the high-end filter 29 (see FIG. 2) with respect to particles of 0.3 μm. The blowing wind speed at the side surface portion having the size $D_5$ was 0.8 m/sec. The blowing wind speed at the center portion of the air-permeable front surface 11f was 0.5 m/sec in the range from 25 mm to at least 1500 mm at the forward side of the air-permeable front surface 11f.

FIG. 14 also shows a line F that divides the size of the clearance CL and that extends in the front-rear direction Z at the center the air-permeable front surface 11f in the height direction of the device combination 201. Line F shows distances from the air-permeable front surface 11f in terms of mm. The 0-mm distance denotes a point corresponding to the front surface portion 11f. When the distance is positive, the distance shown is toward the downstream side from the air-permeable front surface 11f, while when the distance is negative, the distance shown is toward the upstream side from the air-permeable front surface 11f. In the performance evaluation of the device combination 201, wind speeds on line F were measured with the clearance CL between the device 1 and the device 101 set at 10, 20, 30, 40, and 50 mm. The results of measurement of the wind speeds (unit:m/sec) are as shown in Table 4.

Table 4 clearly shows that in the clearance CL between the device 1 and the device 101, an air flow toward the upstream side and an air flow toward the downstream side exist. It is also seen that at a distance of approximately 100 mm downstream from the air-permeable front surface 11f, setting the clearance CL at 20 to 50 mm, more preferably 30 to 50 mm, ensures that the wind speed obtained on line F is approximately equal to the wind speed at the forward side of the air-permeable front surface 11f. It is also seen that to obtain a working space for a uniform flow of air at the device 1 and the device 101 of the illustrated example, it is preferable to set the clearance CL at a suitable size based on the data on Table 4. The measuring instrument used to measure the wind speeds was Model 1560, available from KANOMAX.

TABLE 4

| Distance from front surface (mm) | Clearance (CL) between adjacent hoods | | | | |
|---|---|---|---|---|---|
| | 10 mm | 20 mm | 30 mm | 40 mm | 50 mm |
| −57.500 | −0.154 | −0.688 | −0.619 | −0.581 | −0.543 |
| −52.500 | −0.221 | −0.711 | −0.636 | −0.596 | −0.559 |
| −47.500 | −0.299 | −0.733 | −0.652 | −0.611 | −0.574 |
| −42.500 | −0.402 | −0.753 | −0.666 | −0.623 | −0.587 |
| −37.500 | −0.549 | −0.769 | −0.678 | −0.634 | −0.599 |
| −32.500 | −0.731 | −0.783 | −0.687 | −0.642 | −0.608 |
| −27.500 | −0.909 | −0.793 | −0.690 | −0.644 | −0.612 |
| −22.500 | −1.065 | −0.794 | −0.679 | −0.632 | −0.604 |
| −17.500 | −1.164 | −0.759 | −0.628 | −0.580 | −0.560 |
| −12.500 | −1.096 | −0.593 | −0.452 | −0.408 | −0.410 |
| −9.000 | −0.699 | −0.339 | −0.237 | −0.202 | −0.226 |
| −7.000 | −0.252 | −0.095 | −0.043 | −0.025 | −0.050 |
| −5.000 | 0.239 | 0.147 | 0.140 | 0.135 | 0.108 |
| −3.000 | 0.693 | 0.391 | 0.326 | 0.297 | 0.265 |
| −1.000 | 1.113 | 0.650 | 0.529 | 0.474 | 0.434 |
| 3.570 | 1.163 | 0.778 | 0.678 | 0.637 | 0.609 |
| 10.710 | 1.121 | 0.780 | 0.697 | 0.668 | 0.652 |
| 17.860 | 1.078 | 0.765 | 0.688 | 0.664 | 0.652 |
| 25.000 | 1.041 | 0.749 | 0.676 | 0.652 | 0.640 |
| 32.140 | 1.009 | 0.733 | 0.663 | 0.638 | 0.626 |
| 39.290 | 0.982 | 0.719 | 0.650 | 0.625 | 0.611 |
| 46.400 | 0.957 | 0.706 | 0.639 | 0.613 | 0.597 |
| 53.600 | 0.936 | 0.694 | 0.627 | 0.602 | 0.584 |
| 60.700 | 0.917 | 0.682 | 0.617 | 0.590 | 0.571 |
| 67.900 | 0.900 | 0.672 | 0.607 | 0.580 | 0.559 |
| 75.000 | 0.884 | 0.662 | 0.597 | 0.569 | 0.547 |
| 82.100 | 0.870 | 0.653 | 0.588 | 0.559 | 0.535 |
| 89.300 | 0.858 | 0.644 | 0.579 | 0.550 | 0.524 |
| 96.400 | 0.846 | 0.636 | 0.571 | 0.540 | 0.513 |
| 103.600 | 0.835 | 0.629 | 0.563 | 0.531 | 0.503 |
| 110.700 | 0.825 | 0.622 | 0.556 | 0.523 | 0.493 |
| 117.900 | 0.815 | 0.616 | 0.549 | 0.515 | 0.484 |
| 125.000 | 0.806 | 0.610 | 0.543 | 0.508 | 0.475 |
| 132.100 | 0.798 | 0.605 | 0.537 | 0.501 | 0.467 |
| 139.300 | 0.790 | 0.599 | 0.531 | 0.494 | 0.460 |
| 146.400 | 0.783 | 0.595 | 0.526 | 0.488 | 0.453 |
| 153.600 | 0.776 | 0.590 | 0.521 | 0.482 | 0.447 |
| 160.700 | 0.770 | 0.586 | 0.516 | 0.477 | 0.441 |
| 167.900 | 0.763 | 0.582 | 0.512 | 0.472 | 0.435 |
| 175.000 | 0.757 | 0.578 | 0.508 | 0.467 | 0.430 |

TABLE 4-continued

| Distance from front surface (mm) | Clearance (CL) between adjacent hoods | | | | |
|---|---|---|---|---|---|
| | 10 mm | 20 mm | 30 mm | 40 mm | 50 mm |
| 182.100 | 0.752 | 0.575 | 0.504 | 0.463 | 0.426 |
| 189.300 | 0.747 | 0.572 | 0.501 | 0.459 | 0.421 |
| 196.400 | 0.741 | 0.569 | 0.498 | 0.455 | 0.418 |
| 203.600 | 0.737 | 0.566 | 0.495 | 0.451 | 0.414 |

Figure 15:
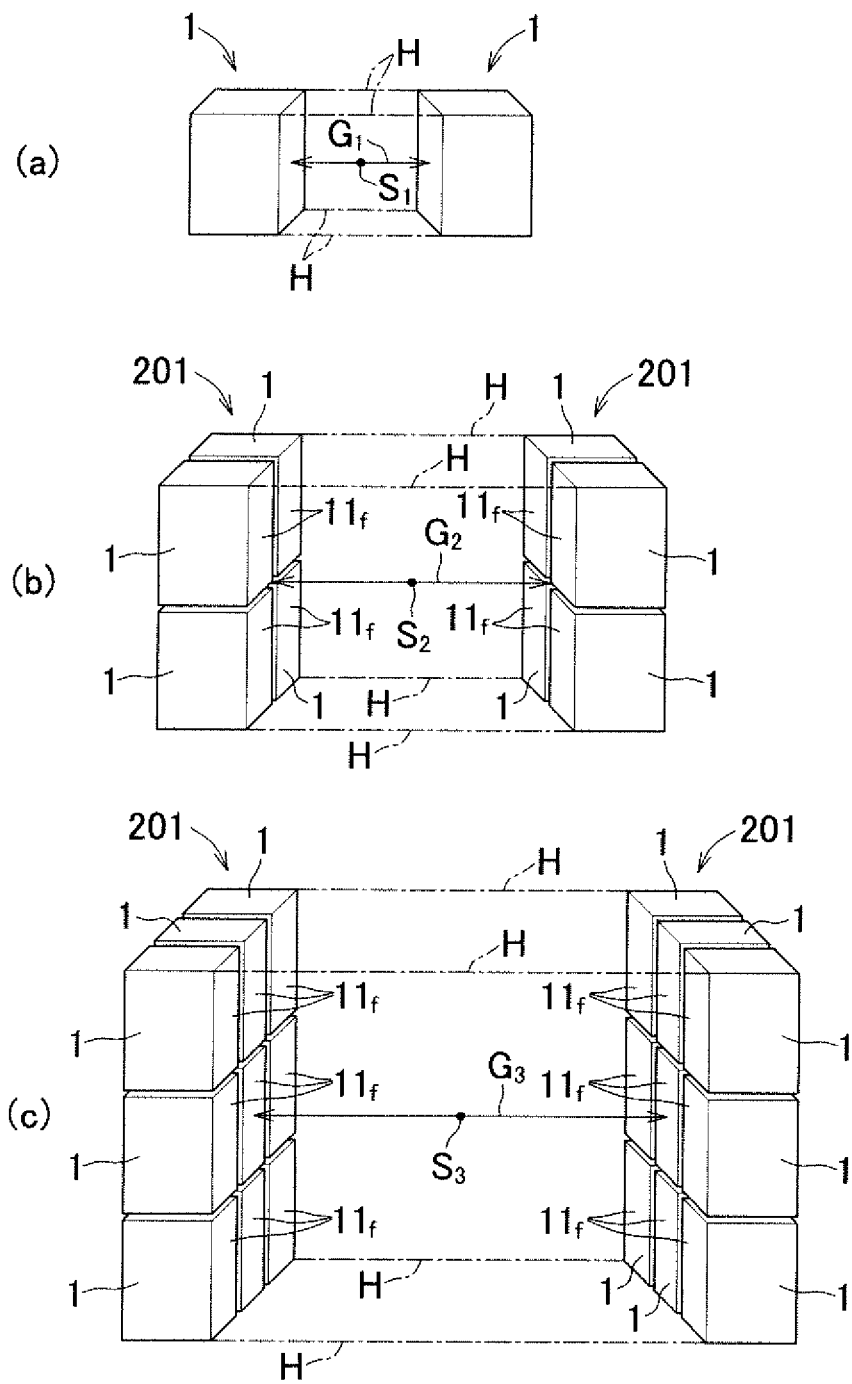
FIG. 15 illustrates an exemplary device combination serving as a push-push blowing device.

FIG. 15 illustrates an embodiment of the device combination 201 serving as a push-push blowing device. FIG. 15(a) shows a conventional push-push blowing device where the single blowing devices 1 shown in FIG. 13 are disposed in opposing arrangement. FIGS. 5(b) and 5(c) each show a push-push blowing device where a pair of device combinations 201 are disposed. The blowing devices 1 of the device combination 201 are the same as the blowing devices 1 shown in FIG. 13, in which the high-end filter (see FIG. 2) is used and the wind speed at the air-permeable front surface 11f is 0.5 m/sec. It is noted, however, that the air-permeable front surface 11f is set at 1050 mm width×850 mm height, the clearance CL between adjacent blowing devices 1 is set at 10 mm, and the size $D_5$ exemplified in FIG. 6 is set at 10 mm. The double-headed arrows $G_1$ to $G_3$ shown in FIG. 15 each denote a size over which the pair of blowing devices 1 or the pair of the device combinations 201 are spaced apart from one another. The space sizes $G_1$ to $G_3$ respectively have mid-points $S_1$ to $S_3$, which are measurement points of the suspended particle concentration using Particle Counter KC-18, available from LION.

In FIG. 15(a), the pair of blowing devices 1 are set to make the spaced-apart size $G_1$ 2000 mm. An imaginary working space of 1.8 m³ volume is defined by imaginary lines H extending between corner portions of the pair of blowing devices 1 and by the air-permeable front surfaces 11f.

In FIG. 15(b), the device combinations 201 are each made up of four blowing devices 1. The pair of device combinations 201 are set to make the spaced-apart size $G_2$ 4000 mm. An imaginary working space of 14.3 m³ volume is defined by the pair of blowing devices 201 and the imaginary lines H.

In FIG. 15(c), the device combinations 201 are each made up of nine blowing devices 1. The pair of device combinations 201 are set to make the spaced-apart size $G_3$ 6000 mm. An imaginary working space of 48.2 m³ volume is defined by the pair of device combinations 201 and the imaginary lines H. The blowing flow rate at each of the device combinations 201 was 482 m³/minute.

Table 5 shows an elapse of time from the start of operating the push-push blowing devices shown in FIGS. 15(a) to 15(c), and the results of measurement of the suspended particle concentration at the mid-points $S_1$ to $S_3$ after the start of operating. The suspended particle concentration is measured as a ratio to the suspended particle concentration of air in the chamber at the upstream side of any single blowing devices 1 selected from (a) to (c). For example, in the device of (b) the measured value at 1-second elapse of time is:

$$1.00E+00=1\times10^0=1$$

This value means that the suspended particle concentration at the mid-point $S_1$ is the same as the suspended particle concentration the air in the chamber. At 30-second elapse of time, the measured concentration is:

$$7.56E-0.5=7.56\times10^{-5}$$

This value means that through the 30-second operation, the suspended particle concentration at the mid-point $S_2$ has become equal to or less than 1/10000 the suspended particle concentration of the air in the chamber. As used in the measured value, "E −0.5" means a 10-exponent. Specifically, E −0.5 means $10^{-5}$. Also in Table 5, when the measured value is 0, this means that no suspended particles were detected.

According to Table 5, the elapse of time from the start of operation before the suspended particle concentration becomes equal to or less than 1/10000 the suspended particle concentration of the air in the chamber is 19 seconds in FIG. 15(a), 30 seconds in FIG. 15(b), and 43 seconds in FIG. 15(c). Thus, with the use of the push-push blowing device using the device combination 201 based on the present invention, a large volume of working space can be turned into a clean zone in a significantly short time.

TABLE 5

| Elapse of time from start of operation (sec) | Devices of FIG. 5 | | |
|---|---|---|---|
| | (a) G = 2000 | (b) G = 4000 | (c) G = 6000 |
| 1 | 9.91E−01 | 1.00E+00 | 1.00E+00 |
| 2 | 9.31E−01 | 1.00E+00 | 1.00E+00 |
| 3 | 7.83E−01 | 9.99E−01 | 1.00E+00 |
| 4 | 5.83E−01 | 9.95E−01 | 1.00E+00 |
| 5 | 3.93E−01 | 9.83E−01 | 9.98E−01 |
| 6 | 2.48E−01 | 9.54E−01 | 9.93E−01 |
| 7 | 1.50E−01 | 9.05E−01 | 9.78E−01 |
| 8 | 8.76E−02 | 8.36E−01 | 9.47E−01 |
| 9 | 4.98E−02 | 7.52E−01 | 8.94E−01 |
| 10 | 2.77E−02 | 6.57E−01 | 8.15E−01 |
| 11 | 1.52E−02 | 5.55E−01 | 7.15E−01 |
| 12 | 8.16E−03 | 4.48E−01 | 6.04E−01 |
| 13 | 4.34E−03 | 3.44E−01 | 4.94E−01 |
| 14 | 2.28E−03 | 2.50E−01 | 3.94E−01 |
| 15 | 1.19E−03 | 1.72E−01 | 3.09E−01 |
| 16 | 6.16E−04 | 1.13E−01 | 2.40E−01 |
| 17 | 3.19E−04 | 7.06E−02 | 1.86E−01 |
| 18 | 1.65E−04 | 4.29E−02 | 1.43E−01 |
| 19 | 8.59E−05 | 2.55E−02 | 1.10E−01 |
| 20 | 4.51E−05 | 1.49E−02 | 8.52E−02 |
| 21 | 2.39E−05 | 8.64E−03 | 6.58E−02 |
| 22 | 1.28E−05 | 4.99E−03 | 5.08E−02 |
| 23 | 6.95E−06 | 2.87E−03 | 3.91E−02 |
| 24 | 3.81E−06 | 1.66E−03 | 3.01E−02 |
| 25 | 2.10E−06 | 9.62E−04 | 2.30E−02 |
| 26 | 1.17E−06 | 5.65E−04 | 1.76E−02 |
| 27 | 6.52E−07 | 3.34E−04 | 1.33E−02 |
| 28 | 3.36E−07 | 2.00E−04 | 1.01E−02 |
| 29 | 1.35E−07 | 1.22E−04 | 7.53E−03 |
| 30 | 5.65E−08 | 7.56E−05 | 5.60E−03 |
| 31 | 4.11E−11 | 4.77E−05 | 4.13E−03 |
| 32 | 0 | 3.05E−05 | 3.03E−03 |
| 33 | 0 | 1.97E−05 | 2.21E−03 |
| 34 | 0 | 1.29E−05 | 1.61E−03 |
| 35 | 0 | 7.95E−06 | 1.16E−03 |
| 36 | 0 | 8.76E−06 | 8.33E−04 |
| 37 | 0 | 6.81E−06 | 5.97E−04 |
| 38 | 0 | 6.85E−06 | 4.26E−04 |
| 39 | 0 | 3.88E−06 | 3.04E−04 |
| 40 | 0 | 1.14E−06 | 2.16E−04 |
| 41 | 0 | 0 | 1.54E−04 |
| 42 | 0 | 0 | 1.10E−04 |
| 43 | 0 | 0 | 7.82E−05 |
| 44 | 0 | 0 | 5.61E−05 |
| 45 | 0 | 0 | 4.04E−05 |
| 46 | 0 | 0 | 2.93E−05 |
| 47 | 0 | 0 | 2.13E−05 |
| 48 | 0 | 0 | 1.56E−05 |
| 49 | 0 | 0 | 1.15E−05 |
| 50 | 0 | 0 | 8.57E−06 |
| 51 | 0 | 8.66E−07 | 6.39E−06 |
| 52 | 0 | 2.01E−06 | 4.76E−06 |
| 53 | 0 | 2.90E−06 | 3.56E−06 |
| 54 | 0 | 3.42E−06 | 2.66E−06 |
| 55 | 0 | 3.59E−06 | 2.00E−06 |
| 56 | 0 | 3.36E−06 | 1.51E−06 |
| 57 | 0 | 2.87E−06 | 1.12E−06 |
| 58 | 0 | 2.34E−06 | 8.08E−07 |
| 59 | 0 | 1.80E−06 | 5.73E−07 |
| 60 | 0 | 1.19E−06 | 3.99E−07 |

(Note)
E denotes a 10-exponent, For example, E+00 = $10^0$ E−01 = $10^{-1}$, E−05 = $10^{-5}$

REFERENCE SIGNS LIST

1 Blowing device
7 Side surface portion
11f Air-permeable front surface
11a Side surface portion (bent portion)
15 Lateral edge
70a First ventilation hole
70b Second ventilation hole
70c Third ventilation hole
112 Side plate
113 Top plate
114 Bottom plate
115 Spacer
$W_3$ Inner size
X Width direction
Y Vertical direction
Z Front-rear direction

The invention claimed is:

1. A plurality of air blowing devices, each air blowing device
comprising an external-air intake portion at a rear portion side of the air blowing device and positioned below an air blowing portion, the air blowing portion including a blowing plate and a rectifier mechanism disposed at a flow path through which air flows from an upstream side toward a downstream side of the flow path, whereby the air past the rectifier mechanism is rendered a uniform air flow to be supplied to a downstream side of the rectifier mechanism,
air taken in from the external-air intake portion blown out through the blowing portion,
wherein the device comprises a front-rear direction corresponding to a flow direction of the uniform air flow with a forward side of the front-rear direction corresponding to the downstream side, a width direction orthogonal to the front-rear direction, and a vertical direction orthogonal to the front-rear direction and the width direction,
wherein the blowing plate comprises an air-permeable front surface formed at the downstream side of the rectifier mechanism and comprising a plurality of first ventilation holes distributed in the width direction and the vertical direction, and an end surface portion extending toward the upstream side and crossing the air-permeable front surface from at least one vertical edge among an upper vertical edge and a lower vertical edge disposed in the vertical direction of the air-permeable front surface and extending in the width direction, and wherein the plurality of air blowing devices are aligned in the vertical direction and opposed to each other, adjacent air blowing devices forming a clearance, wherein a plurality of third ventilation holes are distributed at least one of the end surface portions of each blowing plate of each air blowing device, at least one of the end surface portions of one of the plurality of air blowing devices opposite to another end surface portion of another one of plurality of air blowing devices, wherein the third ventilation holes are configured to blow out part of the air past the rectifier mechanism outward in the vertical direction, and the third ventilation holes are configured to blow out part of the air past rectifier mechanism toward the end surface portions of one of the adjacent air blowing devices among the plurality of air blowing devices and the air flow blown out from the third ventilation holes of the adjacent air blowing devices opposed to each other in the vertical direction collide with each other at the clearance.

2. The plurality of air blowing devices according to claim 1, wherein the first and third ventilation holes each comprise a hole diameter in a range of 0.5 to 4 mm, and a ratio of an area of the first ventilation holes to 10 cm$^2$ area of the air-permeable front surface and a ratio of an area of the third ventilation holes to 10 cm$^2$ area of the end surface portion is in a range of 20 to 50%.

3. The plurality of air blowing devices according to claim 2, wherein a distance between respective centers of adjacent first ventilation holes and a distance between respective centers of adjacent third ventilation holes are in a range of 1 to 6 mm.

4. The plurality of air blowing devices according to claim 1,
wherein the device comprises side surface portions extending toward the upstream side from lateral edges of the air-permeable front surface that are disposed at respective side portions of the air-permeable front surface in the width direction and extend in the vertical direction, and
wherein a plurality of second ventilation holes are distributed at at least one of opposite side surface portion in the width direction, the second ventilation holes being configured to blow out part of the air past the rectifier mechanism outward in the width direction.

5. The plurality of air blowing devices according to claim 1, wherein the air-permeable front surface is mountable and removable relative to the device.

* * * * *